US011802206B2

(12) United States Patent
Moffat et al.

(10) Patent No.: US 11,802,206 B2
(45) Date of Patent: Oct. 31, 2023

(54) PARTICLES COMPRISING POLYAMIDES WITH PENDENT PIGMENTS AND RELATED METHODS

(71) Applicant: Xerox Corporation, Norwalk, CT (US)

(72) Inventors: Karen A. Moffat, Brantford (CA); Valerie M. Farrugia, Oakville (CA)

( * ) Notice: Subject to any disclaimer, the term of this patent is extended or adjusted under 35 U.S.C. 154(b) by 498 days.

(21) Appl. No.: 16/946,634

(22) Filed: Jun. 30, 2020

(65) Prior Publication Data

US 2021/0070992 A1    Mar. 11, 2021

Related U.S. Application Data

(60) Provisional application No. 62/897,534, filed on Sep. 9, 2019.

(51) Int. Cl.
| C08L 77/02 | (2006.01) |
| C08J 3/14 | (2006.01) |
| C08L 77/06 | (2006.01) |
| C08K 3/014 | (2018.01) |
| C08K 3/013 | (2018.01) |

(52) U.S. Cl.
CPC ............. *C08L 77/02* (2013.01); *C08J 3/14* (2013.01); *C08L 77/06* (2013.01); *C08K 3/013* (2018.01); *C08K 3/014* (2018.01); *C08K 2201/011* (2013.01)

(58) Field of Classification Search
CPC .............. C08J 3/20–226; C08J 2379/08; C08J 2377/00–12; C08K 3/013; C08K 3/14; C08L 2666/54; C08L 2666/58; C08L 2666/62; C08L 2666/70; C08L 2666/72
See application file for complete search history.

(56) References Cited

U.S. PATENT DOCUMENTS

| 4,863,646 | A | 9/1989 | Watanabe et al. |
| 5,859,075 | A | 1/1999 | Shukla et al. |
| 5,990,290 | A | 11/1999 | Phillips |
| 7,740,938 | B2 | 6/2010 | Helft et al. |
| 8,822,555 | B2 | 9/2014 | Kaiso et al. |
| 10,655,025 | B2 | 5/2020 | Farrugia et al. |
| 2011/0229545 | A1 | 9/2011 | Shum et al. |
| 2015/0152214 | A1 | 6/2015 | Uenlue |
| 2017/0129177 | A1 | 5/2017 | Hattig et al. |

FOREIGN PATENT DOCUMENTS

| CN | 104 194 326 A | 12/2014 |
| DE | 10 2014 102137 A1 | 8/2015 |
| EP | 0 866 088 A | 9/1998 |
| EP | 2 098 574 A1 | 9/2009 |
| JP | 2002080629 A | 3/2002 |
| WO | 1999067224 A1 | 12/1999 |
| WO | 2015/109143 A | 7/2015 |
| WO | 2019073030 A1 | 4/2019 |

OTHER PUBLICATIONS

H. Patil, et al. Hot-melt extrusion: from theory to application in pharmaceutical applicaitons, AAPS PharmSciTech, vol. 17, No. 1, pp. 20-42, Feb. 2016.
J Sundararaj, et al. Drop breakup and coalescence in polymer blends: the effects of concentration and compatibilization. Macromolecules 1995,28, 2647-2657.
R G Kleijnen, et al., Production and Processing of a Spherical Polybutylene Terephthalate Powder for Laser Sintering, Appl. Sci. 2019, 9(7), 1308.
I. Pillin, et al. Crystallization kinetics of poly(butylene terephthalate) (PBT): Influence of additives and free carboxylic acid chain ends. Polym. Eng. Sci 2001, 41, 178-191.
S Fanselow, et al. AIP Conference Proceedings 1713, 140007 (2016)—Production of micron-sized polymer particles for additive manufacturing by melt emulsification.
M Schmid, et al., AIP Conference Proceedings 1664, 160009 (2015)—Polymer powders for selective laser sintering (SLS).
M. Schmid, et al., Additive Manufacturing: Polymers Applicable for Laser Sintering (LS), Procedia Engineering 149 (2016) 457-464.
J. J. Heikkinen, J. P. Heiskanen, O. E. O. HORMI, Grafting of functionalized silica particles with poly(acrylic acid). Polymers for Advanced Technologies, 2006; 17, 426-429.
D. Peerman, et. al., Reaction of Polyamide Resins and Epoxy Resins, Industrial and Engineering Chemistry, 1957, 49(7), 1091-1094.
L. Shechter et al, Glycidyl Ether Reactions with Amines, Industrial and Engineering Chemistry 1956, 48(1), 94-97.
EP search report for related matter EP20194476.6 dated Feb. 25, 2021.

*Primary Examiner* — Ana L. Woodward
(74) *Attorney, Agent, or Firm* — Vorys, Sater, Seymour, and Pease LLP

(57) ABSTRACT

A nonlimiting example method of forming polyamide polymer particles having pigments therein may comprising: mixing a mixture comprising a polyamide having a pigment pendent from a backbone of the polyamide (PP-polyamide), a carrier fluid that is immiscible with the PP-polyamide, and optionally an emulsion stabilizer at a temperature greater than a melting point or softening temperature of the PP-polyamide and at a shear rate sufficiently high to disperse the PP-polyamide in the carrier fluid; and cooling the mixture to below the melting point or softening temperature of the PP-polyamide to form solidified particles comprising the PP-polyamide and, when present, the emulsion stabilizer associated with an outer surface of the solidified particles. Said solidified particles may be used in additive manufacturing to make a variety of objects like containers, toys, furniture parts and decorative home goods, plastic gears, automotive parts, medical items, and the like.

10 Claims, 1 Drawing Sheet

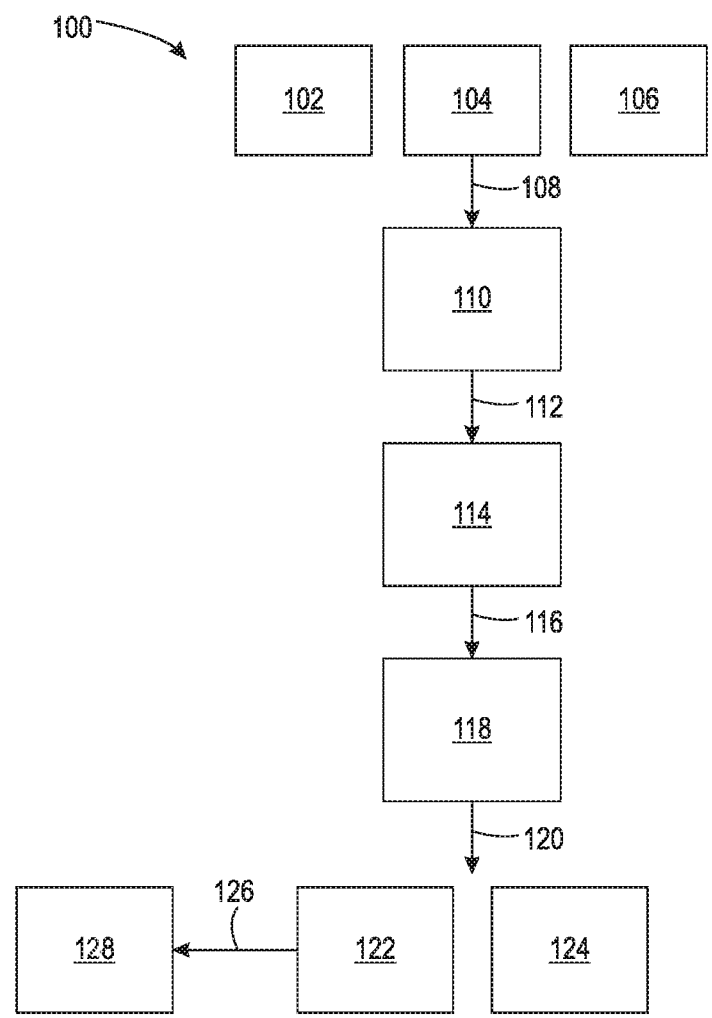

PARTICLES COMPRISING POLYAMIDES WITH PENDENT PIGMENTS AND RELATED METHODS

CROSS-REFERENCE TO RELATED APPLICATIONS

The present application claims the benefit of priority under 35 U. S. C. § 119 from U.S. Provisional Patent Application 62/897,534, filed on Sep. 9, 2019 and incorporated herein by reference in its entirety.

TECHNICAL FIELD

The present disclosure relates to compositions, synthesis methods, and applications of polyamides having pigments pendent from the backbone of the polyamide. For example, particles may comprise polyamides having pigments pendent from the backbone of the polyamide.

BACKGROUND

Thermoplastic polymers are often used to make extruded objects like films, bags, particles, and filaments. One example of a thermoplastic polymer is a polyamide. Polyamides like nylons are off-white colored polymers that have the ability to withstand elevated or low temperatures without loss of physical properties. Therefore, objects formed with polyamides can be used in demanding applications like power tools, automotive parts, gears, and appliance parts. In some instances, the application may call for the polyamide-made part to be colored. Because pigments are particulates, pigments can be difficult to homogeneously mix in the polyamide, which causes the coloring of the resultant part to be uneven.

One application where homogeneous incorporation of pigments is especially important is the rapidly growing technology area of three-dimensional (3-D) printing, also known as additive manufacturing. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS).

Powder particulates usable in 3-D printing include thermoplastic polymers, including thermoplastic elastomers, metals and other solidifiable substances. One example thermoplastic polymer is nylon. Nylons are off-white colored polymers that have the ability to withstand elevated or low temperatures without loss of physical properties. Therefore, nylons can be used in demanding applications like power tools, automotive parts, gears, and appliance parts.

When using a particulate pigment in 3-D printing, the particulates should be evenly dispersed throughout the small melted droplets or the power particulate, or the coloring of the final object will be uneven.

SUMMARY OF INVENTION

The present disclosure relates to compositions, synthesis methods, and applications of polyamides having pigments pendent from the backbone of the polyamide. For example, particles may comprise polyamides having pigments pendent from the backbone of the polyamide.

Described herein is a method comprising: functionalizing metal oxide particles that are bound to a pigment particle with a compound having an epoxy to produce a surface treated pigment having a pendent epoxy; and reacting the pendent epoxy with a polyamide to yield a pigment-pendent polyamide (PP-polyamide).

Described herein is a method comprising: functionalizing metal oxide particles that are bound to a pigment particle with a silica particle having a carboxylic acid surface treatment to produce a surface treated pigment having a pendent carboxylic acid; converting the pendent carboxylic acid to a pendent acid chloride; and reacting the pendent acid chloride with a polyamide to yield a PP-polyamide.

Described herein is a composition comprising: a polyamide having a pigment pendent from a backbone of the polyamide, wherein the pigment comprises metal oxide particles on the surface of a pigment particle.

Also described herein are objects comprising the foregoing compositions.

Described herein is a method comprising: mixing a mixture comprising a polyamide having a PP-polyamide, a carrier fluid that is immiscible with the PP-polyamide, and optionally an emulsion stabilizer at a temperature greater than a melting point or softening temperature of the PP-polyamide and at a shear rate sufficiently high to disperse the PP-polyamide in the carrier fluid; and cooling the mixture to below the melting point or softening temperature of the PP-polyamide to form solidified particles comprising the PP-polyamide and, when present, the emulsion stabilizer associated with an outer surface of the solidified particles.

Described herein is a composition comprising: particles comprising a polyamide having a PP-polyamide and having a circularity of about 0.90 to about 1.0. Said particles may further comprise one or more emulsion stabilizers associated with an outer surface of the particles.

Also disclosed herein are methods that comprise: depositing said particles (that comprise the PP-polyamide) optionally in combination with other thermoplastic polymer particles upon a surface in a specified shape; and once deposited, heating at least a portion of the particles to promote consolidation thereof and form a consolidated body.

BRIEF DESCRIPTION OF THE DRAWINGS

The following FIGURES are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

The FIGURE is a flow chart of a nonlimiting example method of the present disclosure.

DETAILED DESCRIPTION

The present disclosure relates to compositions, synthesis methods, and application methods of polyamides having a pigment pendent from the backbone of the polyamide, also referred to herein as an polyamide having pendent pigments or PP-polyamide. Because the polyamides are functionalized with the pigment particles, objects that incorporate the PP-polyamide will have a more evenly dispersed pigment.

The present disclosure also relates to particles comprising polyamides having a pigment pendent from the backbone of the polyamide (also referred to herein as a pigment-pendent polyamide or PP-polyamide) and related methods. More specifically, the present disclosure includes methods of making highly spherical polymer particles comprising the one or more PP-polyamides and optionally one or more other thermoplastic polymers. Said polymer particles may be useful, among other things, as starting material for additive manufacturing.

The polymer particles described herein may be, for example, produced by melt emulsification methods where one or more PP-polyamides and optionally one or more additional thermoplastic polymers are dispersed as a melt in a carrier fluid that is immiscible with the PP-polyamide and additional thermoplastic polymers, if used. A sufficient amount of shear is applied to the mixture to cause the polymer melt to form droplets in the carrier fluid.

Because the pigment is pendent from the backbone of the polyamide, objects produced by additive manufacturing methods that include these particles should maintain an even color over time because the pigment cannot migrate within the object.

Definitions and Test Methods

As used herein, the term "pigment" refers to a particle that absorbs and/or refracts ultraviolet or visible light. As used herein, a "surface treated pigment" refers to a pigment having oxide particles chemically bonded and/or physically bonded to the surface of the pigment particle.

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherence via hydrogen bonding and/or other mechanisms. However, chemical bonding may be occurring to some degree.

As used herein, the term "embed" relative to nanoparticles and a surface of a polymer particle refers to the nanoparticle being at least partially extended into the surface such that polymer is in contact with the nanoparticle to a greater degree than would occur if the nanoparticle were simply laid on the surface of the polymer particle.

Herein, D10, D50, D90, and diameter span are primarily used herein to describe particle sizes. As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. As used herein, the term "D90" refers to a diameter at which 90% of the sample (on a volume basis unless otherwise specified) is comprised of particles having a diameter less than said diameter value.

As used herein, the terms "diameter span" and "span" and "span size" when referring to diameter provides an indication of the breadth of the particle size distribution and is calculated as (D90-D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instruments software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle.

As used herein, the term "sintering window" refers to the difference between the melting temperature (Tm) onset and the crystallization temperature (Tc) onset, or (Tm-Tc) onset. Tm, Tm (onset), Tc, and Tc (onset) are determined by differential scanning calorimetry per ASTM E794-06(2018) with a 10° C./min ramp rate and a 10° C./min cool rate.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

Pigment-Pendent Polyamides

Generally, the compositions, synthesis methods, and application methods of the present disclosure use a linker that chemically bonds to the oxide particles of the surface treated pigment to a nitrogen of the polyamide. The result is a PP-polyamide. Because surface treated pigments have several oxide particles on the surface, the surface treated pigment particles can act as crosslinkers for the polyamides.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), semi-aromatic polyamide, aromatic polyamides (aramides), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. Examples of polyamide elastomers include, but are not limited to, polyesteramide, polyetheresteramide, polycarbonate-esteramide, and polyether-block-amide elastomers. Herein, a polyamide followed by a single number is a polyamide having that number of backbone carbons between each nitrogen. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—$(CH_2)_6$—NH—CO—$(CH_2)_8$—CO]$_n$. A polyamide followed by number(s) backslash number(s) are a copolymer of the polyamides indicated by the numbers before and after the backslash.

Pigments may impart a color, a metallic color, and/or a pearlescent color such as gold, silver aluminum, bronze, gold bronze, stainless steel, zinc, iron, tin and copper pigments to the polyamide. Examples of pigments include, but are not limited to, synthetic mica (e.g., fluorphlogopite), natural mica (e.g., muscovite), talc, sericite, kaolin, glass, $SiO_2$ flakes, $Al_2O_3$ flakes, glass flakes, acicular pigments (e.g., BiOCl, colored glass fibers, $\alpha$-$Fe_2O_3$, and $\alpha$-FeOOH), $CaSO_4$, iron oxides, chromium oxides, carbon black, metal effect pigments (e.g., Al flakes and bronzes), optically variable pigments (OVPs), liquid crystal polymer pigments (LCPs), holographic pigments, and the like, and any combination thereof.

Examples of metal oxides that may be coating the surface of a pigment include, but are not limited to, titanium dioxide, titanium suboxides, titanium oxynitrides, $Al_2O_3$, $Fe_2O_3$, $Fe_3O_4$, $SnO_2$, $Cr_2O_3$, ZnO, CuO, NiO, zirconium oxide, iron titanium oxides (iron titanates), other metal oxides, and the like, and any combination thereof. Preferred metal oxides include $TiO_2$ and/or $Fe_2O_3$.

Surface treated pigments may be any combination of the foregoing pigments with one or more metal oxides, alone or in a mixture in a uniform layer or in successive layers. For example, the surface treated pearlescent pigments may be pigments based on platelet-shaped, transparent or semitransparent substrates like sheet silicates, which are coated with colored or colorless metal oxides like titanium oxides and iron oxides, alone or in a mixture in a uniform layer or in successive layers. Particularly preferred surface treated pigments contain $TiO_2$-coated mica, $Fe_2O_3$-coated mica, $TiO_2$/$Fe_2O_3$-coated mica, and any combination thereof.

Examples of commercially available surface treated pigments include, but are not limited to, REFLEX pigments (synthetic mica-based pearlescent pigments, available from CQV), IRIODIN™ (mica-based, metal oxide-coated pearlescent pigments, available from Merck) (e.g., IRIODIN™ 300 "Gold Pearl" and IRIODIN™ 100 "Silver Pearl"), SUNGEM™ (glass platelet-based pigments, available from Sun Chemical), SUNMICA™ (mica-based pigments, available from Sun Chemical), SYNCRYSTAL™ (metal oxide coated synthetic fluorphlogopite flakes, available from Eckart), and the like, and any combination thereof. Other metallic color pearlescent pigments from Merck include TIMIRON® Bronze MP60 with a D50 volume average particle size (50% of the pigments have a volume size of less than the stated size) of 22-37 microns, TIMIRON® Copper MP-65 D50 size of 22-37 microns, COLORONA® Oriental Beige D50 size of 3-10 microns, COLORONA® Aborigine Amber D50 size of 18-25 microns, COLORONA® Passion Orange with D50 size of 18-25 microns, COLORONA® Bronze Fine of D50 size of 7-14, COLORONA® Bronze with D50 size of 18-25 microns, COLORONA® Bronze Sparkle of D50 size of 28-42 microns, COLORONA® Copper Fine with D50 size of 7-14 microns, COLORONA® Copper with D50 size of 18-25, COLORONA® Copper Sparkle with D50 size of 25-39 microns, COLORONA® Red Brown with D50 size of 18-25 microns, COLORONA® Russet with D50 size of 18-25 microns, COLORONA® Tibetan Ochre with D50 size of 18-25 microns, COLORONA® Sienna Fine with D50 size of 7-14 microns, COLORONA® Sienna with D50 size of 18-25 microns, COLORONA® Bordeaux with D50 size of 18-25 microns, COLORONA® Glitter Bordeaux, COLORONA® Chameleon with D50 size of 18-25 microns. Also suitable are Merck mica based pigments with metal oxide particle coatings such as the Merck silvery white pigments including TIMIRON® Super Silk MP-1005 with D50 size of 3-10 microns, TIMIRON® Super Sheen MP-1001 with D50 size of 7-14 microns, TIMIRON® Super Silver Fine with D50 size of 9-13 microns, TIMIRON® Pearl Sheen MP-30 with D50 size of 15-21 microns, TIMIRON® Satin MP-11171 with D50 size of 11-20 microns, TIMIRON® Ultra Luster MP-111 with D50 size of 18-25 microns, TIMIRON® Star Luster MP-111 with D50 size of 18-25 microns, TIMIRON® Pearl Flake MP-10 with D50 size of 22-37 microns, TIMIRON® Super Silver with D50 size of 17-26 microns, TIMIRON® Sparkle MP-47 with D50 size of 28-38 microns, TIMIRON® Arctic Silver with D50 size of 19-25 microns, XIRONA® Silver with D50 size of 15-22 microns, RONASTAR® Silver with D50 size of 25-45 microns, and the like, and any combination thereof. For very bright colors, examples from Merck include COLORONA® Carmine Red with D50 size of 10-60 microns giving a Red lustrous effect, COLORONA® Magenta with D50 size of 18-25 microns, giving a pink-violet lustrous effect, COLORONA® Light Blue with D50 size of 18-25 microns, to give a light blue lustrous effect, COLORONA® Dark Blue with D50 size of 18-25 microns to give a dark blue lustrous effect, COLORONA® Majestic Green with 18-25 microns to give a green lustrous color, COLORONA® Brilliant Green of D5 19-26 microns to give a Green-golden lustrous color, COLORONA® Egyptian Emerald of D50 18-25 microns to give a dark green lustrous effect, COLORONA® Patagonian Purple of 18-25 microns size to give a purple lustrous effect, and the like, and any combination thereof. Mica based special effect pigments having a D50 from about 18 microns to about 50 microns from Eckart may also be used, such as DORADO® PX 4001, DORADO® PX 4261, DORADO® PX 4271, DORADO® PX 4310, DORADO® PX 4331, DORADO® PX 4542, PHOENIX® XT, PHOENIX® XT 2001, PHOENIX® XT 3001, PHOENIX® XT 4001, PHOENIX® XT 5001, PHOENIX® PX 1000, PHOENIX® PX 1001, PHOENIX® PX 1221, PHOENIX® PX 1231, PHOENIX® PX 1241, PHOENIX® PX 1251, PHOENIX® PX 1261, PHOENIX® PX 1271, PHOENIX® PX 1310, PHOENIX® PX 1320, PHOENIX® PX 1502, PHOENIX® PX 1522, PHOENIX® PX 1542, PHOENIX® PX 2000, PHOENIX® PX 2000 L, PHOENIX® PX 2001, PHOENIX® PX 2011, PHOENIX® PX 2021, PHOENIX® PX 2221, PHOENIX® PX 2231, PHOENIX® PX 2241, PHOENIX® PX 2251, PHOENIX® PX 2261, PHOENIX® PX 2271, PHOENIX® PX 3001, PHOENIX® PX 4000, PHOENIX® PX 4001, PHOENIX® PX 4221, PHOENIX® PX 4231, PHOENIX® PX 4241, PHOENIX® PX 4251, PHOENIX® PX 4261, PHOENIX® PX 4271, PHOENIX® PX 4310, PHOENIX® PX 4320, PHOENIX® PX 4502, PHOENIX® PX 4522, PHOENIX® PX 4542, PHOENIX® PX 5000, PHOENIX® PX 5001, PHOENIX® PX 5310, PHOENIX® PX 5331, and the like, and any combination thereof. Special effect pigments such as Silberline aluminum flake pigments may be used, such as 16 micron DF-1667, 55 micron DF-2750, 27 micron DF-3500, 35 micron DF-3622, 15 micron DF-554, 20 micron DF-L-520AR, 20 micron LED-1708AR, 13 micron LED-2314AR, 55 micron SILBERCOTE™ PC 0452Z, 47 micron SILBERCOTE™ PC 1291X, 36 micron SILBERCOTE™, 36 micron SILBERCOTE™ PC 3331X, 31 micron SILBERCOTE™ PC 4352Z, 33 micron SILBERCOTE™ PC 4852X, 20 micron SILBERCOTE™ PC 6222X, 27 micron SILBERCOTE™ PC 6352Z, 25 micron SILBERCOTE™ PC 6802X, 14 micron SILBERCOTE™ PC 8152Z, 14 micron SILBERCOTE™ PC 8153X, 16 micron SILBERCOTE™ PC 8602X, 20 micron SILVET®/SILVEX® 890 Series, 16 micron SILVET®/SILVEX® 950 Series, and the like, and any combination thereof.

Surface treated pigments may have an average diameter (or D50) of about 1 micron to about 500 microns (or about 1 micron to about 25 microns, or about 5 microns to about 50 microns, or about 25 microns to about 200 microns, or about 100 microns to about 300 microns, or about 250 microns to about 500 microns). Without being limited by theory, it is believed that larger pigment particles impart greater coloring, metallic, and/or pearlescent effects to the polyamide.

Scheme 1 below is a first nonlimiting example synthesis of a PP-polyamide. More specifically, a difunctional linkage reagent containing for example an alkoxysilane end group and a glycidyl functional group. The alkoxysilane group (illustrated with $Si(—OCH_3)_3$ groups where one or more of such groups may be hydrolyzed to —OH groups) is coupled to the surface of the oxide particles (MOx particles) on the surface of the pigment. While the silane is shown as coupling only to the metal oxide particles, the silane may also couple to the surface of the pigment depending on the composition of the pigment. Then, the epoxy of the glycidyl moiety reacts with the nitrogen of the amide in the polyamide (illustrated using nylon 6) to yield a PP-polyamide. While the epoxy is illustrated as a terminal epoxy, the difunctional linkage reagent may have one or more glycidyl functional groups (or epoxy groups) that are terminal, pendent, or include both terminal and pendent of such groups. As illustrated, the pigment is chemically linked to four polyamide chains, which illustrates that the pigment may also be a crosslinker.

Scheme 1

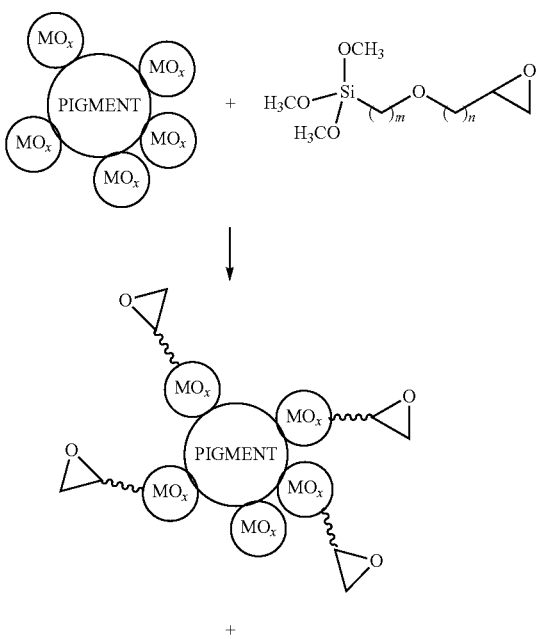

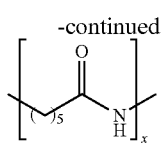

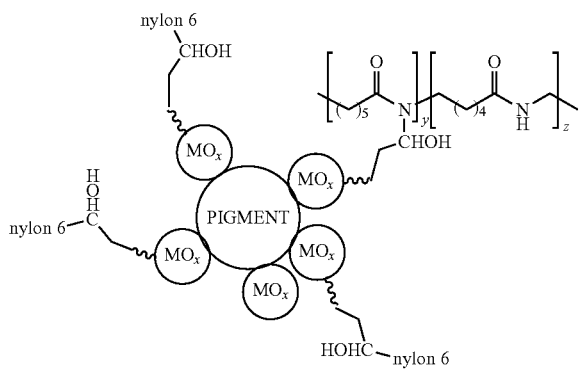

Examples of silanes having a glycidyl moiety include, but are not limited to, (3-glycidoxypropyl)trimethoxysilane, (3-glycidoxypropyl)triethoxysilane, diethoxy(3-glycidyloxypropyl)methylsilane and 1,3-bis(3-dlycidyloxypropyl)tetramethylsiloxane, 2-(3,4 epoxycyclohexyl) ethyltrimethoxysilane, 3-glycidoxypropyl methyldimethoxysilane, 3-glycidoxypropyl methyldiethoxysilane, 5,6-epoxyhexyltriethoxysilane, and the like, and any combination thereof.

The silane coupling reaction can be performed by known methods. For example, as outlined in reference by X. Guillory et al. called *Glycidyl Alkoxysilanc Reactivities Towards Simple Nucleophiles in Organic Media for Improved Molecular Structure Definition in Hybrid Materials* in Royal Society of Chemistry Advances 2016, 6, 74087-74099. The outcome of the reactions are highly dependent on the reaction conditions; selection of solvent whether it be aqueous, organic or ionic liquid media, temperature concentration, catalyst and acidic or basic conditions. Also from the cited U.S. Pat. No. 7,998,649, the metallic oxide coated mica pigment that is a silica or titania particle surface is reacted with (3-glycidoxypropyl) trimethoxysilane or (3-glycidoxypropyl)triethoxysilane or diethoxy(3-glycidyloxypropyl)methylsilane or 1,3-bis(3-dlycidyloxypropyl)tetramethylsiloxane in a molar ratio of 0.85 to 0.15 with the appropriate amount of ethanol or methanol, water, and ammonia to prepare the epoxide containing component. The solution is then stirred for a period of time of about 2 to about 10 hours at room temperature or slightly elevated up to 40° C.

In another example, the silane coupling reaction can be performed by hydrolytic deposition of silanes (B. Arkles, CHEMTECH, 7, 766, 1977) where the silane oligomers hydrogen bond with OH groups of the substrate. During drying or curing, a covalent linkage is formed with the substrate with concomitant loss of water. Methods for enhancing reactivity include transesterification catalysts and agents which increase the acidity of hydroxyl groups on the substrate by hydrogen bonding. Transesterification catalysts include tin compounds such as dibutyldiacetoxytin and titanates such as titanium isopropoxide. Incorporation of transesterification catalysts at about 2 wt % to about 3 wt % of the silane effectively promotes reaction and deposition in many instances, others include tetrabutyl titanate or the reaction can be promoted by addition of catalytic amounts of amines such as benzyldimethylamine The reaction conditions may include a coupling agent may be present at about 0.1 wt % to about 5 wt % relative to the pigment, reaction times may be about 4 hours to about 12 hours, temperatures may be about 50° C. to about 120° C., and ethanol solvent may be preferred over methanol, where water in the solvent is at levels of about 1 wt % to about 5 wt % to promote hydrolysis of the silane during attachment to the surface.

In yet another example, the silane coupling reaction can be performed by anhydrous liquid phase deposition where toluene, tetrahydrofuran, and/or hydrocarbon solutions are prepared containing about 1 wt % to about 10 wt % silane. The mixture is refluxed for about 12 hours to about 24 hours with the substrate (pigment in this instance) to be treated. The treated pigment is washed with the solvent. The solvent is then removed by air or explosion proof oven drying. No further cure is necessary.

The epoxide group on the metallic pigment reactions with the polyamide may be performed under an atmosphere (nitrogen or argon) at temperatures of about 70° C. to about 200° C. (or about 70° C. to about 150° C., or about 125° C. to about 200° C.) in the presence of an organic solvent such as tetrahydrofuan, dimethylformamide or toluene or the like. The mixture is then stirred for about 24 hours at an elevated temperature. After cooling the mixture to room temperature, the grafted polymer is filtered and washed to remove organic impurities and unreacted starting reagents.

Scheme 2 below is a second nonlimiting example synthesis of a PP-polyamide. More specifically, silica particles having a surface functionality with at least one carboxylic acid (which may be terminal as shown, pendent, or both terminal and pendent) are grafted onto the metal oxide particle (but some may graft to the pigment depending on the pigment compositions). Then, the carboxylic acids from the functionalized silica particles are converted to acid chlorides, which react with the nitrogen of the amide in the polyamide (illustrated using nylon 6) to yield a PP-polyamide. As illustrated, the pigment is chemically linked to four polyamide chains, which illustrates that the surface coated pigment (surface of the pigment and/or surface of the metal oxide particles) may also be a crosslinker.

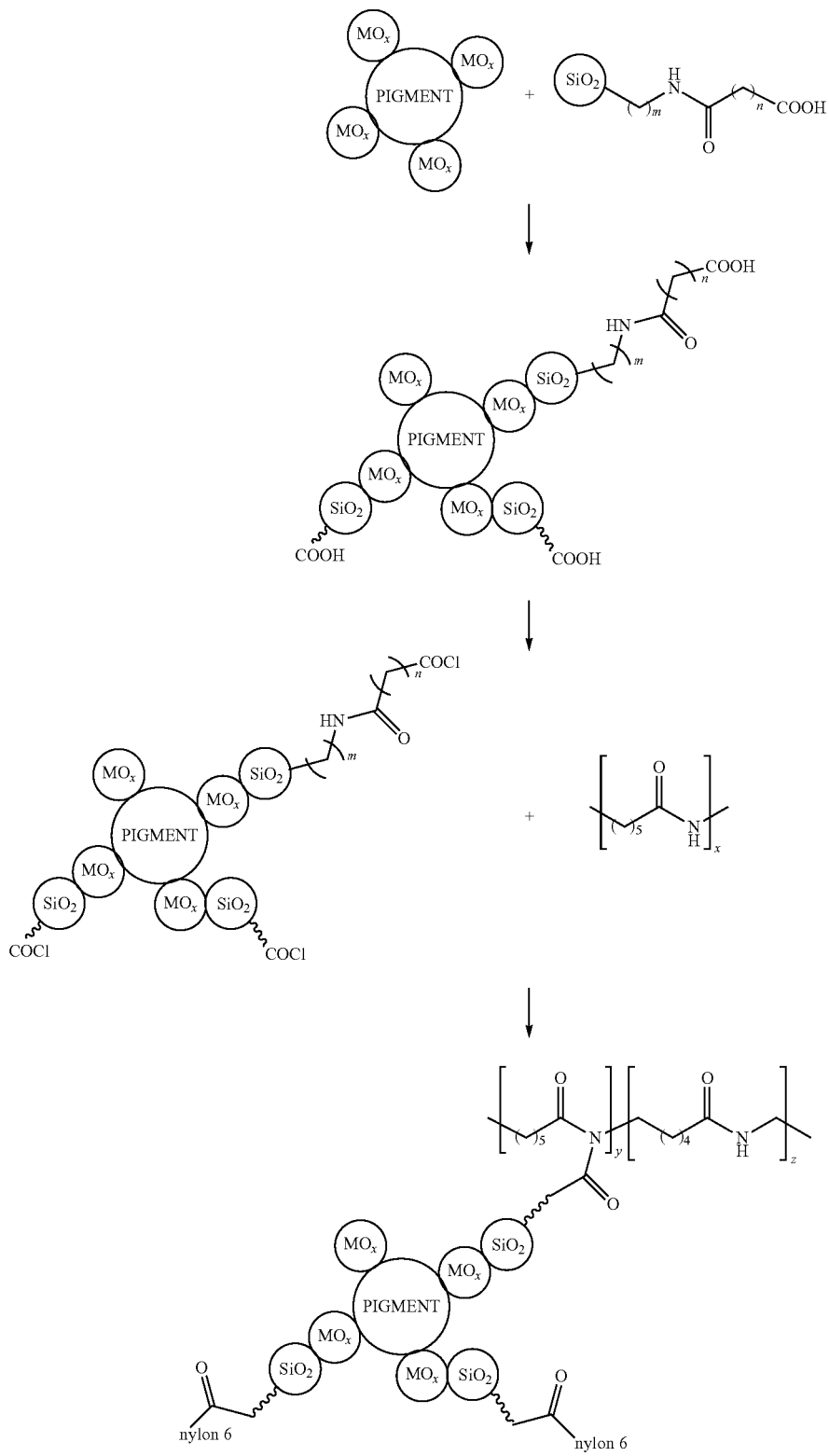

Scheme 2

Examples of functionalized silica particles include, but are not limited to, 3-aminopropyl-(3-oxobutanoic) acid functionalized silica, 3-propylsulphonic acid-functionalized silica gel, propylcarboxylic acid functionalized silica, tri-aminetetraacetic acid-functionalized silica gel, propionyl chloride-functionalized silica gel, 3-carboxypropyl functionalized silica gel, aminomethylphosphonic acid (AMPA)-functionalized silica gel, 1,4,7,10-tetraazacyclododecane-1,4,7,10-tetraacetic acid (DOTA)-functionalized silica gel, and the like, and any combination thereof.

The grafting reaction of the functionalized silica to the pigment can be performed by known methods. Similar to the glycidyl functionalized coated pigments of Scheme 1, silanes that contain reactive alkoxy (OR) functional groups can react with the surface hydroxyl groups of the metal oxide particles and/or the pigments. When the silane solution is applied onto the surface hydroxyl groups of the metal oxide particles and/or the pigments, the free silanol groups first form hydrogen bonding with the hydroxyl (—OH) groups on the metal oxide particles and/or the pigments at ambient temperature. Then, a $SiO_2$ linkage is formed between the silanol and the —OH groups on the surface of the $SiO_2$ linkage by condensation.

The conversion of the carboxylic acid to the more reactive acid chloride can be performed by known methods. For example, oxalyl chloride $(COCl)_2$ and/or thionyl chloride $SOCl_2$ may be used as chlorinating agents in conjunction with a catalyst. Solvents for said reactions may include, but are not limited to, dimethylformamide, dichloromethane, and the like, and any combination thereof.

The acid chloride/polyamide reaction with the polyamide may be performed by known methods. For example, the pigment having the acid chloride functionality may be melt mixed with polyamide at about 125° C. to about 250° C. (or about 125° C. to about 200° C., or about 150° C. to about 225° C., or about 200° C. to about 250° C.) for about 15 minutes to about 1 hour or longer (or about 15 minutes to about 30 minutes, or about 20 minutes to about 40 minutes, or about 30 minutes to about 1 hour).

Scheme 1 and Scheme 2 include nonlimiting examples of synthetic routes to producing a surface treated pigment having pendent epoxy or carboxylic acid moieties. Other reaction schemes will be apparent to those skilled in the art.

The surface treated pigment having pendent epoxy or carboxylic acid moieties are reacted with the polyamide to yield the PP-polyamides described herein.

Whether by Scheme 1, Scheme 2, or another coupling reaction scheme, the PP-polyamides described herein may have a weight ratio of pigment to polyamide of about 1:10 to about 1:1000 (or about 1:10 to about 1:200, or about 1:100 to about 1:500, or about 1:250 to about 1:1000).

Applications of PP-Polyamides

The PP-polyamides described herein may be used to produce a variety of objects (or articles). The PP-polyamides described herein may be used alone or in combination with other thermoplastic polymers (e.g., polyamides without an optical absorber and/or other thermoplastic polymers). Examples of thermoplastic polymers that may be used in conjunction with one or more PP-polyamides of the present disclosure include, but are not limited to, polyamides (e.g., polyamides not coupled to a pigment), polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems described herein.

If needed, compatibilizers may be used when combining the PP-polyamides described herein with other thermoplastic polymers. Compatibilizers may improve the blending efficiency and/or efficacy of the polymers. Examples of polymer compatibilizers include, but are not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT' (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

Methods for producing objects include, but are not limited to, melt extrusion, injection molding, compression molding, melt spinning, melt emulsification, spray drying (e.g., to form particles), cryogenic milling (or cryogenic grinding), freeze drying polymer dispersions, precipitation of polymer dispersions, and the like, and any hybrid thereof.

Examples of articles that may be produced by such methods where the PP-polyamide may be all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

In addition, the PP-polyamides described herein may have a specific chemical fingerprint that is useful in identifying objects, tracking objects, authenticating objects, and/or determining the health of objects. Further, the placement of where the PP-polyamides are located in the objects is another layer of fingerprinting the objects for identifying objects, tracking objects, authenticating objects, and/or determining the health of objects.

Methods of identifying objects, tracking objects, authenticating objects, and/or determining the health of objects may include (a) exposing the object comprising PP-polyamides to electromagnetic radiation; (b) sensing one or more spectra related to the electromagnetic radiation absorbed and/or reemitted; and (c) comparing the spectra to the known spectra for the optical absorbers used in said object or portion thereof. Optionally, the location of where the spectra area is located on the object may be compared to the known location where the spectra area should be. The comparison(s) can be used for identifying and/or authenticating the object. For tracking, the comparison(s) may be done and/or the detected spectra and/or spectra area may be logged into a database along with the physical location of the object. Further, the health of objects that wear and/or crack can be ascertained. For example, a core portion of the article may comprise optical absorbers and an outer portion may cover the core portion and not comprise the optical absorbers (or comprise different optical absorbers). Then, when comparing spectra, the appearance of spectral features for the optical absorbers in the core may indicate that the object is at or near the end of life.

By way of nonlimiting example, 3-D printing processes of the present disclosure may comprise: depositing particles comprising one or more PP-polyamides of the present disclosure (and optionally one or more other thermoplastic polymers and/or one or more compatibilizers) upon a surface in a specified shape, and once deposited, heating at least a portion of the particles to promote consolidation thereof and form a consolidated body (object), such that the consolidated body has a void percentage of about 1% or less after being consolidated. For example, heating and consolidation of the thermoplastic polymer particles may take place in a 3-D printing apparatus employing a laser, such that heating and consolidation take place by selective laser sintering.

By way of nonlimiting example, 3-D printing processes of the present disclosure may comprise: extruding a filament comprising one or more PP-polyamides of the present disclosure (and optionally one or more other thermoplastic polymers and/or one or more compatibilizers) through an orifice, wherein the filament becomes a polymer melt upon extrusion; depositing the polymer melt as a first layer on a platform; cooling the layer; depositing an additional layer of the polymer melt on the first layer; cooling the additional layer; repeating depositing and cooling for at least one additional layer to produce a 3-D shape.

Yet another nonlimiting example is a method comprising: extruding a polymer melt comprising one or more PP-polyamides of the present disclosure (and optionally one or more other thermoplastic polymers and/or one or more compatibilizers) through an orifice to produce a film, a fiber (or a filament), particles, pellets, or the like.

Thermoplastic Polymer Particles and Methods of Making

The FIGURE is a flow chart of a nonlimiting example method 100 of the present disclosure. Thermoplastic polymer 102 (comprising one or more PP-polyamides and optionally one or more other thermoplastic polymers), carrier fluid 104, and optionally emulsion stabilizer 106 are combined 108 to produce a mixture 110. The components 102, 104, and 106 can be added in any order and include mixing and/or heating during the process of combining 108 the components 102, 104, and 106.

The mixture 110 is then processed 112 by applying sufficiently high shear to the mixture 110 at a temperature greater than the melting point or softening temperature of the thermoplastic polymer 102 to form a melt emulsion 114. Because the temperature is above the melting point or softening temperature of the thermoplastic polymer 102, the thermoplastic polymer 102 becomes a polymer melt. The shear rate should be sufficient enough to disperse the polymer melt in the carrier fluid 104 as droplets (i.e., the polymer emulsion 114). Without being limited by theory, it is believed that, all other factors being the same, increasing shear should decrease the size of the droplets of the polymer melt in the carrier fluid 104. However, at some point there may be diminishing returns on increasing shear and decreasing droplet size or may be disruptions to the droplet contents that decrease the quality of particles produced therefrom.

The melt emulsion 114 inside and/or outside the mixing vessel is then cooled 116 to solidify the polymer droplets into thermoplastic polymer particles (also referred to as solidified thermoplastic polymer particles). The cooled mixture 118 can then be treated 120 to isolate the thermoplastic polymer particles 122 from other components 124 (e.g., the carrier fluid 104, excess emulsion stabilizer 106, and the like) and wash or otherwise purify the thermoplastic polymer particles 122. The thermoplastic polymer particles 122 comprise the thermoplastic polymer 102 and, when included, at least a portion of the emulsion stabilizer 106 coating the outer surface of the thermoplastic polymer particles 122. Emulsion stabilizers 106, or a portion thereof, may be deposited as a uniform coating on the thermoplastic polymer particles 122. In some instances, which may be dependent upon non-limiting factors such as the temperature (including cooling rate), the type of thermoplastic polymer 102, and the types and sizes of emulsion stabilizers 106, the nanoparticles of emulsion stabilizers 106 may become at least partially embedded within the outer surface of the thermoplastic polymer particles 122 in the course of becoming associated therewith. Even without embedment taking place, at least the nanoparticles within emulsion stabilizers 106 may remain robustly associated with thermoplastic polymer particles 122 to facilitate their further use. In contrast, dry blending already formed thermoplastic polymer particulates (e.g., formed by cryogenic grinding or precipitation processes) with a flow aid like silica nanoparticles does not result in a robust, uniform coating of the flow aid upon the thermoplastic polymer particulates.

Advantageously, carrier fluids and washing solvents of the systems and methods described herein (e.g., method 100) can be recycled and reused. One skilled in the art will recognize any necessary cleaning of used carrier fluid and solvent necessary in the recycling process.

The thermoplastic polymer 102 and carrier fluid 104 should be chosen such that at the various processing temperatures (e.g., from room temperature to process temperature) the thermoplastic polymer 102 and carrier fluid 104 are immiscible. An additional factor that may be considered is the differences in (e.g., a difference or a ratio of) viscosity at process temperature between the molten polyamide 102 and the carrier fluid 104. The differences in viscosity may affect droplet breakup and particle size distribution. Without being limited by theory, it is believed that when the viscosities of the molten polyamide 102 and the carrier fluid 104 are too similar, the circularity of the product as a whole may be reduced where the particles are more ovular and more elongated structures are observed.

The thermoplastic polymers 102 comprises one or more PP-polyamides and optionally one or more other thermoplastic polymers. Examples of other thermoplastic polymers include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

The other thermoplastic polymers in the compositions and methods of the present disclosure may be elastomeric or non-elastomeric. Some of the foregoing examples of other thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in the *Handbook of Thermoplastic Elastomers,* 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Examples of polyamides include, but are not limited to, those described above. Examples of polyamide elastomers include, but are not limited to, polyesteramide, polyetheresteramide, polycarbonate-esteramide, and polyether-block-amide elastomers.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly [4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy of PP-polyamides with one or more thermoplastic polymers. Examples of polymer compatibilizers include, but are not limited to, the compatibilizers described above.

The thermoplastic polymers 102 (comprising one or more PP-polyamides and optionally one or more other thermoplastic polymers) may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymers 102 may optionally comprise an additive. Typically, the additive would be present before addition of the thermoplastic polymers 102 to the mixture 110. Therefore, in the thermoplastic polymer melt droplets and resultant thermoplastic polymer particles, the additive is dispersed throughout the thermoplastic polymer. Accordingly, for clarity, this additive is referred to herein as an "internal additive." The internal additive may be blended with the thermoplastic polymer just prior to making the mixture 110 or well in advance.

When describing component amounts in the compositions described herein (e.g., the mixture 110 and the thermoplastic polymer particles 122), a weight percent based on the thermoplastic polymer 102 not inclusive of the internal additive. For example, a composition comprising 1 wt % of emulsion stabilizer by weight of 100 g of a thermoplastic polymer 102 comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer 102. For example, the thermoplastic polymer 102 may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The thermoplastic polymer 102 may be present in the mixture 110 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the thermoplastic polymer 102 and carrier fluid 104 combined.

Suitable carrier fluids 104 have a viscosity at 25° C. of about 1000 cSt to about 150,000 cSt (or about 1000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. The carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 110 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the thermoplastic polymer 102 and carrier fluid 104 combined.

In some instances, the carrier fluid 104 may have a density of about 0.6 g/cm$^3$ to about 1.5 g/cm$^3$, and the thermoplastic polymer 102 has a density of about 0.7 g/cm$^3$ to about 1.7 g/cm$^3$, wherein the thermoplastic polymer has a density similar, lower, or higher than the density of the carrier fluid.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m²/g), AEROSIL® 380 (silica nanoparticles having a hydrophilically modified surface and a BET surface area of 380±30 m²/g)), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m²/g to about 500 m²/g (or about 10 m²/g to about 150 m²/g, or about 25 m²/g to about 100 m²/g, or about 100 m²/g to about 250 m²/g, or about 250 m²/g to about 500 m²/g).

Nanoparticles may be included in the mixture 110 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the thermoplastic polymer 102.

Surfactants may be anionic, cationic, nonionic, or zwitterionic. Examples of surfactants include, but are not limited to, sodium dodecyl sulfate, sorbitan oleates, poly [dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 110 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 110 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added in any order and include mixing and/or heating during the process of combining 108 the components 102, 104, and 106. For example, the emulsion stabilizer 106 may first be dispersed in the carrier fluid 104, optionally with heating said dispersion, before adding the thermoplastic polymer 102. In another nonlimiting example, the thermoplastic polymer 102 may be heated to produce a polymer melt to which the carrier fluid 104 and emulsion stabilizer 106 are added together or in either order. In yet another nonlimiting example, the thermoplastic polymer 102 and carrier fluid 104 can be mixed at a temperature greater than the melting point or softening temperature of the thermoplastic polymer 102 and at a shear rate sufficient enough to disperse the thermoplastic polymer melt in the carrier fluid 104. Then, the emulsion stabilizer 106 can be added to form the mixture 110 and maintained at suitable process conditions for a set period of time.

Combining 108 the components 102, 104, and 106 in any combination can occur in a mixing apparatus used for the processing 112 and/or another suitable vessel. By way of nonlimiting example, the thermoplastic polymer 102 may be heated to a temperature greater than the melting point or softening temperature of the thermoplastic polymer 102 in the mixing apparatus used for the processing 112, and the emulsion stabilizer 106 may be dispersed in the carrier fluid 104 in another vessel. Then, said dispersion may be added to the melt of the thermoplastic polymer 102 in the mixing apparatus used for the processing 112.

The mixing apparatuses used for the processing 112 to produce the melt emulsion 114 should be capable of maintaining the melt emulsion 114 at a temperature greater than the melting point or softening temperature of the thermoplastic polymer 102 and applying a shear rate sufficient to disperse the polymer melt in the carrier fluid 104 as droplets.

Examples of mixing apparatuses used for the processing 112 to produce the melt emulsion 114 include, but are not limited to, extruders (e.g., continuous extruders, batch extruders, and the like), stirred reactors, blenders, reactors with inline homogenizer systems, and the like, and apparatuses derived therefrom.

Processing 112 and forming the melt emulsion 114 at suitable process conditions (e.g., temperature, shear rate, and the like) for a set period of time.

The temperature of processing 112 and forming the melt emulsion 114 should be a temperature greater than the melting point or softening temperature of the thermoplastic polymer 102 and less than the decomposition temperature of any components 102, 104, and 106 in the mixture 110. For example, the temperature of processing 112 and forming the melt emulsion 114 may be about 1° C. to about 50° C. (or about 1° C. to about 25° C., or about 5° C. to about 30° C., or about 20° C. to about 50° C.) greater than the melting point or softening temperature of the thermoplastic polymer 102 provided the temperature of processing 112 and forming the melt emulsion 114 is less than the decomposition temperature of any components 102, 104, and 106 in the mixture 110.

The shear rate of processing 112 and forming the melt emulsion 114 should be sufficiently high to disperse the polymer melt in the carrier fluid 104 as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 112 and forming the melt emulsion 114 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 112 can be stopped. That time may depend on, among other things, the temperature, shear rate, thermoplastic polymer 102 composition, the carrier fluid 104 composition, and the emulsion stabilizer 106 composition.

The melt emulsion 114 may then be cooled 116. Cooling 116 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 114. In some instances, the shear applied during heating may be applied during cooling.

The cooled mixture 118 resulting from cooling 116 the melt emulsion 114 comprises solidified thermoplastic polymer particles 122 (or simply thermoplastic polymer particles 122) and other components 124 (e.g., the carrier fluid 104, excess emulsion stabilizer 106, and the like). The thermoplastic polymer particles may be dispersed in the carrier fluid or settled in the carrier fluid.

The cooled mixture 118 may then be treated 120 to the separate thermoplastic polymer particles 122 (or simply thermoplastic polymer particles 122) from the other components 124. Suitable treatments include, but are not limited to, washing, filtering, centrifuging, decanting, and the like, and any combination thereof.

Solvents used for washing the thermoplastic polymer particles 122 should generally be (a) miscible with the carrier fluid 104 and (b) nonreactive (e.g., non-swelling and non-dissolving) with the thermoplastic polymer 102. The choice of solvent will depend on, among other things, the composition of the carrier fluid and the composition of the thermoplastic polymer 102.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the thermoplastic polymer particles 122 by drying using an appropriate method such as air-drying, heat-drying, reduced pressure drying, freeze drying, or a hybrid thereof. The heating may be performed preferably at a temperature lower than the glass transition point of the thermoplastic polymer (e.g., about 50° C. to about 150° C.).

The thermoplastic polymer particles 122 after separation from the other components 124 may optionally be further classified to produce purified thermoplastic polymer particles 128. For example, to narrow the particle size distribution (or reduce the diameter span), the thermoplastic polymer particles 122 can be passed through a sieve having a pore size of about 10 µm to about 250 µm (or about 10 µm to about 100 µm, or about 50 µm to about 200 µm, or about 150 µm to about 250 µm).

In another example purification technique, the thermoplastic polymer particles 122 may be washed with water to remove surfactant while maintaining substantially all of the nanoparticles associated with the surface of the thermoplastic polymer particles 122. In yet another example purification technique, the thermoplastic polymer particles 122 may be blended with additives to achieve a desired final product. For clarity, because such additives are blended with the thermoplastic particles 122 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the thermoplastic polymer particles 122 may be unwanted in downstream applications. Accordingly, yet another example purification technique may include at least substantial removal of the surfactant from the thermoplastic polymer particles 122 (e.g., by washing and/or pyrolysis).

The thermoplastic polymer particles 122 and/or purified thermoplastic polymer particles 128 (referred to as particles 122/128) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 122/128, in general, includes emulsion stabilizers (a) dispersed on an outer surface of the particles 122/128 and/or (b) embedded in an outer portion (e.g., outer 1 vol %) of the particles 122/128.

Further, where voids form inside the polymer melt droplets, emulsion stabilizers 106 should generally be at (and/or embedded in) the interface between the interior of the void and the thermoplastic polymer. The voids generally do not contain the thermoplastic polymer. Rather, the voids may contain, for example, carrier fluid, air, or be void. The particles 122/128 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 122/128.

The thermoplastic polymer 102 may be present in the particles 122/128 at about 90 wt % to about 99.5 wt % (or about 90 wt % to about 95 wt %, or about 92 wt % to about 97 wt %, or about 95 wt % to about 99.5 wt %) of the particles 122/128.

When included, the emulsion stabilizers 106 may be present in the particles 122/128 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 122/128. When purified to at least substantially remove surfactant or another emulsion stabilizer, the emulsion stabilizers 106 may be present in the particles 128 at less than 0.01 wt % (or 0 wt % to about 0.01 wt %, or 0 wt % to 0.001 wt %).

Upon forming thermoplastic particulates according to the disclosure herein, at least a portion of the nanoparticles, such as silica nanoparticles, may be disposed as a coating upon the outer surface of the thermoplastic particulates. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the scanning electron microscope images (SEM micrographs). The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs.

The particles 122/128 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The particles 122/128 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow. Without limitation, diameter span values of 1.0 or greater are considered broad, and diameter spans values of 0.75 or less are considered narrow.

In a first nonlimiting example, the particles 122/128 may have a D10 of about 0.1 nm to about 10 μm, a D50 of about 0.5 μm to about 25 μm, and a D90 of about 3 μm to about 50 μm, wherein D10<D50<D90. Said particles 122/128 may have a diameter span of about 0.2 to about 2.

In a second nonlimiting example, the particles 122/128 may have a D10 of about 5 nm to about 30 μm, a D50 of about 30 μm to about 70 μm, and a D90 of about 70 μm to about 120 μm, wherein D10<D50<D90. Said particles 122/128 may have a diameter span of about 1.0 to about 2.5.

In a third nonlimiting example, the particles 122/128 may have a D10 of about 25 nm to about 60 μm, a D50 of about 60 μm to about 110 μm, and a D90 of about 110 μm to about 175 μm, wherein D10<D50<D90. Said particles 122/128 may have a diameter span of about 0.6 to about 1.5.

In a fourth nonlimiting example, the particles 122/128 may have a D10 of about 75 nm to about 125 μm, a D50 of about 100 μm to about 200 μm, and a D90 of about 125 μm to about 300 μm, wherein D10<D50<D90. Said particles 122/128 may have a diameter span of about 0.2 to about 1.2.

In a fifth nonlimiting example, the particles 122/128 may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 nm), and a D90 of about 60 μm to about 300 μm (or about 70 μm to about 200 μm, or about 60 μm to about 150 μm, or about 150 μm to about 300 μm), wherein D10<D50<D90. The particles 122/128 may also have a diameter span of about 0.4 to about 3 (or about 0.6 to about 2, or about 0.4 to about 1.5, or about 1 to about 3).

The particles 122/128 may have a circularity of about 0.9 or greater (or about 0.90 to about 1.0, or about 0.93 to about 0.99, or about 0.95 to about 0.99, or about 0.97 to about 0.99, or about 0.98 to about 1.0).

The particles 122/128 may have an angle of repose of about 25° to about 45° (or about 25° to about 35°, or about 30° to about 40°, or about 35° to about 45°).

The particles 122/128 may have a Hausner ratio of about 1.0 to about 1.5 (or about 1.0 to about 1.2, or about 1.1 to about 1.3, or about 1.2 to about 1.35, or about 1.3 to about 1.5).

The particles 122/128 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 112 and the composition and relative concentrations of the components 102, 104, and 106, different shapes of the structures that compose the particles 122/128 have been observed. Typically, the particles 122/128 comprise substantially spherical particles (having a circularity of about 0.97 or greater). However, other structures including disc and elongated structures have been observed in the particles 122/128. Therefore, the particles 122/128 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 122/128 may have a sintering window that is within 10° C., preferably within 5° C., of the sintering window of the thermoplastic polymer 102 (comprising one or more PP-polyamides and optionally one or more other thermoplastic polymers).

3-Dimensional Printing

The particles comprising PP-polyamides described herein may be useful in a variety of applications including 3-D printing. 3-D printing processes of the present disclosure may comprise: depositing PP-polyamide particles of the present disclosure (e.g., particles comprising one or more PP-polyamides and optionally one or more other thermoplastic polymers) upon a surface in a specified shape, and once deposited, heating at least a portion of the particles to promote consolidation thereof and form a consolidated body (object), such that the consolidated body has a void percentage of about 1% or less after being consolidated. For example, heating and consolidation of the thermoplastic polymer particles may take place in a 3-D printing apparatus employing a laser, such that heating and consolidation take place by selective laser sintering.

Examples of objects that may be 3-D printed using the thermoplastic polymer particles of the present disclosure include, but are not limited to, containers (e.g., for food, beverages, cosmetics, personal care compositions, medicine, and the like), shoe soles, toys, furniture parts and decorative home goods, plastic gears, screws, nuts, bolts, cable ties, automotive parts, medical items, prosthetics, orthopedic implants, aerospace/aircraft-related parts, production of artifacts that aid learning in education, 3-D anatomy models to aid in surgeries, robotics, biomedical devices (orthotics), home appliances, dentistry, electronics, sporting goods, and the like.

Other applications for particles comprising one or more PP-polyamides of the present disclosure may include, but are not limited to, use as a filler in paints and powder coatings, inkjet materials and electrophotographic toners, and the like.

Example Embodiments

A first nonlimiting example embodiment is a method comprising: functionalizing metal oxide particles that are bound to a pigment particle with a compound having an epoxy (terminal, pendent, or include both terminal and pendent of such group) to produce a surface treated pigment having a pendent epoxy; and reacting the pendent epoxy with a polyamide to yield a pigment-pendent polyamide (PP-polyamide). The first nonlimiting example embodiment may further include one or more of: Element 1: wherein the compound having the epoxide is selected from the group consisting of: (3-glycidoxypropyl)trimethoxysilane, (3-glycidoxypropyl)triethoxysilane, diethoxy(3-glycidyloxypropyl)methylsilane and 1,3-bis(3-dlycidyloxypropyl)tetramethylsiloxane, 2-(3,4 epoxycyclohexyl) ethyltrimethoxysilane, 3-glycidoxypropyl methyldimethoxysilane, 3-glycidoxypropyl methyldiethoxysilane, 5,6-epoxyhexyltriethoxysilane, and any combination thereof; Element 2: wherein the metal oxide particles comprise one or more selected from the group consisting of: titanium dioxide, a titanium suboxide, a titanium oxynitride, $Al_2O_3$, $Fe_2O_3$, $Fe_3O_4$, $SnO_2$, $Cr_2O_3$, ZnO, CuO, NiO, zirconium oxide, and an iron titanium oxide; Element 3: wherein the pigment particle comprises one or more selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, and holographic pigments; Element 4: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 5: wherein the reacting of the pendent epoxy with a polyamide is at about 70° C. to about 200° C.; and Element 6: wherein a weight ratio of the pigment to the polyamide is about 1:10 to about 1:1000. Examples of combinations include, but are not limited to, Element 1 in combination with one or more of Elements 2-6; Element 2 in combination with one or more of Elements 3-6; Element 3 in combination with one or more of Elements 4-6; and two or more of Elements 4-6 in combination.

A second nonlimiting example embodiment is the PP-polyamide produced according to the method of the first nonlimiting example embodiment (optionally including one or more of Elements 1-6).

A third nonlimiting example embodiment is a method comprising: functionalizing metal oxide particles that are bound to a pigment particle with a silica particle having a carboxylic acid (terminal, pendent, or include both terminal and pendent of such group) surface treatment to produce a surface treated pigment having a pendent carboxylic acid; converting the pendent carboxylic acid to a pendent acid chloride; and reacting the pendent acid chloride with a polyamide to yield a pigment-pendent polyamide (PP-polyamide). The third nonlimiting example embodiment can further include one or more of: Element 7: wherein the metal oxide particles comprise one or more selected from the group consisting of: titanium dioxide, a titanium suboxide, a titanium oxynitride, $Al_2O_3$, $Fe_2O_3$, $Fe_3O_4$, $SnO_2$, $Cr_2O_3$, ZnO, CuO, NiO, zirconium oxide, and an iron titanium oxide; Element 8: wherein the pigment particle comprises one or more selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, and holographic pigments; Element 9: wherein the silica particle having the carboxylic acid surface treatment comprises one or more selected from the group consisting of: 3-aminopropyl-(3-oxobutanoic) acid functionalized silica, 3-propylsulphonic acid-functionalized silica gel, propylcarboxylic acid functionalized silica, triaminetetraacetic acid-functionalized silica gel, propionyl chloride-functionalized silica gel, 3-carboxypropyl functionalized silica gel, aminomethylphosphonic acid (AMPA)-functionalized silica gel, and 1,4,7,10-tetraazacyclododecane-1,4,7,10-tetraacetic acid (DOTA)-functionalized silica gel; Element 10: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 11: wherein the reacting of the pendent acid chloride with the polyamide comprises melt mixing the pigment particle having a functionality with the pendent acid chloride with the polyamide for 15 minutes to about 1 hour at about 125° C. to about 250° C.; and Element 12: wherein a weight ratio of the pigment to the polyamide is about 1:10 to about 1:1000. Examples of combinations include, but are not limited to, Element 7 in combination with one or more of Elements 8-12; Element 8 in combination with one or more of Elements 9-12; Element 9 in combination with one or more of Elements 10-12; and two or more of Elements 10-12 in combination.

A fourth nonlimiting example embodiment is the PP-polyamide produced according to the method of the third nonlimiting example embodiment (optionally including one or more of Elements 7-12).

A fifth nonlimiting example embodiment is a composition comprising: a polyamide having a pigment pendent from a backbone of the polyamide, wherein the pigment comprises metal oxide particles on the surface of a pigment particle. The third nonlimiting example embodiment may further include one or more of: Element 13: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 14: wherein a weight ratio of the pigment to the polyamide is about 1:10 to about 1:1000; and Element 15: wherein the pigment particle comprises one or more selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, and holographic pigments.

A sixth nonlimiting example embodiment is an object comprising the composition of the fifth nonlimiting example embodiment (optionally including one or more of Elements 13-15), which may be produced by the first or third nonlimiting example embodiments.

A seventh nonlimiting example embodiment is a method comprising: depositing particles upon a surface in a specified shape, and once deposited, wherein the particles comprise the composition of the fifth nonlimiting example embodiment (optionally including one or more of Elements 13-15); and heating at least a portion of the particles to promote consolidation thereof and form a consolidated body. Further, the particles of the seventh nonlimiting example embodiment may further comprise a thermoplastic polymer selected from the group consisting of: polyurethane, polyethylene, polypropylene, polyacetal, polycarbonate, polybutylene terephthalate, polyethylene terephthalate, polyethylene naphthalate, polytrimethylene terephthalate, polyhexamethylene terephthalate, polystyrene, polyvinyl chloride, polytetrafluoroethene, polyester, polyether, polyether sulfone, polyetherether ketone, polyacrylate, polymethacrylate, polyimide, acrylonitrile butadiene styrene, polyphenylene sulfide, vinyl polymer, polyarylene ether, polyarylene sulfide, polysulfone, polyether ketone, polyamide-imide, polyetherimide, polyetherester, copolymers comprising a polyether block and a polyamide block, grafted or ungrafted thermoplastic polyolefin, functionalized or nonfunctionalized ethylene/vinyl monomer polymer, functionalized or nonfunctionalized ethylene/alkyl (meth) acrylate, functionalized or nonfunctionalized (meth)acrylic acid polymer, functionalized or nonfunctionalized ethylene/ vinyl monomer/alkyl (meth)acrylate terpolymer, ethylene/ vinyl monomer/carbonyl terpolymer, ethylene/alkyl (meth) acrylate/carbonyl terpolymer, methylmethacrylate-butadiene-styrene type core-shell polymer, polystyrene-block-polybutadiene-block-poly(methyl methacrylate) block terpolymer, chlorinated or chlorosulphonated polyethylene, polyvinylidene fluoride, phenolic resin, poly(ethylene/vinyl acetate), polybutadiene, polyisoprene, styrenic block copolymer, polyacrylonitrile, silicone, and any combination thereof.

A eighth nonlimiting example embodiment is a method comprising: mixing a mixture comprising a polyamide having a pigment pendent from a backbone of the polyamide (PP-polyamide), a carrier fluid that is immiscible with the PP-polyamide, and optionally an emulsion stabilizer at a temperature greater than a melting point or softening temperature of the PP-polyamide and at a shear rate sufficiently high to disperse the PP-polyamide in the carrier fluid; and cooling the mixture to below the melting point or softening temperature of the PP-polyamide to form solidified particles comprising the PP-polyamide and, when present, the emulsion stabilizer associated with an outer surface of the solidified particles.

A ninth nonlimiting example embodiment is a composition comprising: solidified particles comprising a polyamide having a pigment pendent from a backbone of the polyamide (PP-polyamide) and having a circularity of about 0.90 to about 1.0.

The eighth and ninth example embodiments may include one or more of: Element 16: wherein the emulsion stabilizer is included in the mixture (or wherein the solidified particles further comprise an emulsion stabilizer), and wherein the emulsion stabilizer associated with an outer surface of the solidified particles; Element 17: Element 16 and wherein at least some of the solidified particles have a void comprising the emulsion stabilizer at a void/polymer interface; Element 18: Element 17 and wherein the void contains the carrier fluid; Element 19: Element 17 and wherein the emulsion stabilizer comprises nanoparticles and the nanoparticles are embedded in the void/polymer interface; Element 20: Element 16 and wherein the solidified particles further comprises elongated structures on the surface of the solidified particles, wherein the elongated structures comprises the PP-polyamide with the emulsion stabilizer associated with an outer surface of the elongated structures; Element 21: Element 16 and wherein the emulsion stabilizer forms a coating that covers less than 5% of the surface of the solidified particles; Element 22: Element 16 and wherein the emulsion stabilizer forms a coating that covers at least 5% of the surface of the solidified particles; Element 23: Element 16 and wherein the emulsion stabilizer forms a coating that covers at least 25% of the surface of the solidified particles; Element 24: Element 16 and wherein the emulsion stabilizer forms a coating that covers at least 50% of the surface of the solidified particles; Element 25: Element 16 and wherein the emulsion stabilizer is present in the mixture (or the solidified particles) at 0.05 wt % to 5 wt % by weight of the PP-polyamide; Element 26: Element 16 and wherein the emulsion stabilizer comprises nanoparticles and the nanoparticles have an average diameter of 1 µm to 500 µm; Element 27: Element 16 and wherein the emulsion stabilizer comprises nanoparticles and the nanoparticles comprise oxide nanoparticles; Element 28: Element 16 and wherein the emulsion stabilizer comprises nanoparticles and the nanoparticles comprise carbon black; Element 29: Element 16 and wherein the emulsion stabilizer comprises nanoparticles and the nanoparticles comprise polymer nanoparticles; Element 30: wherein the mixture further comprises a thermoplastic polymer that is not the PP-polyamide (or wherein the solidified particles further comprise a thermoplastic polymer that is not the PP-polyamide); Element 31: wherein the mixture further comprises the polyamide of the PP-polyamide but without a pigment pendent therefrom (or wherein the solidified particles further comprise the polyamide of the PP-polyamide but without a pigment pendent therefrom); Element 32: wherein the pigment is selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, holographic pigments, and any combination thereof; Element 33: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 34: wherein a weight ratio of the pigment to the polyamide is about 1:10 to about 1:1000; Element 35: wherein the solidified particles have a D10 of about 0.1 µm to about 125 µm, a D50 of about 0.5 µm to about 200 µm, and a D90 of about 3 µm to about 300 µm, wherein D10<D50<D90; Element 36: wherein the solidified particles have a diameter span of about 0.2 to about 10; Element 37: wherein the solidified particles have a D10 of about 5 µm to about 30 µm, a D50 of about 30 µm to about 70 µm, and a D90 of about 70 µm to about 120 µm, wherein D10<D50<D90; Element 38: Element 37 and wherein the solidified particles have a diameter span of about 1.0 to about 2.5; Element 39: wherein the solidified particles have a D10 of about 25 µm to about 60 µm, a D50 of about 60 µm to about 110 µm, and a D90 of about 110 µm to about 175 µm, wherein D10<D50<D90; Element 40: Element 39 and wherein the solidified particles have a diameter span of about 0.6 to about 1.5; Element 41: wherein the solidified particles have a D10 of about 75 µm to about 125 µm, a D50 of about 100 µm to about 200 µm, and a D90 of about 125 µm to about 300 µm, wherein D10<D50<D90; Element 42: Element 41 and wherein the solidified particles have a diameter span of about 0.2 to about 1.2; Element 43: wherein the solidified particles have a circularity of about 0.90 to about 1.0; and Element 44: wherein the solidified particles have a Hausner ratio of about 1.0 to about 1.5. Examples of combinations include, but are not limited to, Element 16 in combination with one or more of Elements 17-19; Element 16 in combination with one of Elements 20-24 optionally in further combination with one or more of Elements 17-19; Element 16 (optionally in combination with one of Elements 20-24 and/or optionally in combination with one or more of Elements 17-19) in combination with one or more of Elements 25-29; Element 16 (optionally in combination with one or more of Elements 17-29) in combination with one or more of Elements 30-44; two or more of Elements 30-34 in combination; one or more of Elements 30-34 in combination with one or more of Elements 35-44; and Element 43 and/or 44 in combination with one or more of Elements 35-42.

Further, the eighth nonlimiting example embodiment may further include one or more of: Element 45: wherein the PP-polyamide is present in the mixture at 5 wt % to 60 wt % of the mixture; Element 46: wherein the carrier fluid is selected from the group consisting of: silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof; Element 47: wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof; Element 48: wherein the carrier fluid has a viscosity at 25° C. of 1000 cSt to 150,000 cSt; and Element 49: wherein the carrier fluid has a density of 0.6 $g/cm^3$ to 1.5 $g/cm^3$. Examples of combinations include, but are not limited to, one or more of Elements 16-44 in combination with one or more of Elements 45-49; and two or more of Elements 45-49.

Clauses

Clause 1. A method comprising: functionalizing metal oxide particles that are bound to a pigment particle with a compound having an epoxy (terminal, pendent, or include both terminal and pendent of such group) to produce a surface treated pigment having a pendent epoxy; and reacting the pendent epoxy with a polyamide to yield a pigment-pendent polyamide (PP-polyamide).

Clause 2. The method of Clause 1, wherein the compound having the epoxide is selected from the group consisting of: (3-glycidoxypropyl)trimethoxysilane, (3-glycidoxypropyl)triethoxysilane, diethoxy(3-glycidyloxypropyl)methylsilane and 1,3-bis(3-dlycidyloxypropyl)tetramethylsiloxane, 2-(3,4 epoxycyclohexyl) ethyltrimethoxysilane, 3-glycidoxypropyl methyldimethoxysilane, 3-glycidoxypropyl methyldiethoxysilane, 5,6-epoxyhexyltriethoxysilane, and any combination thereof.

Clause 3. The method of Clause 1, wherein the metal oxide particles comprise one or more selected from the group consisting of: titanium dioxide, a titanium suboxide, a titanium oxynitride, $Al_2O_3$, $Fe_2O_3$, $Fe_3O_4$, $SnO_2$, $Cr_2O_3$, ZnO, CuO, NiO, zirconium oxide, and an iron titanium oxide.

Clause 4. The method of Clause 1, wherein the pigment particle comprises one or more selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, and holographic pigments.

Clause 5. The method of Clause 1, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 6. The method of Clause 1, wherein the reacting of the pendent epoxy with a polyamide is at about 70° C. to about 200° C.

Clause 7. The method of Clause 1, wherein a weight ratio of the pigment to the polyamide is about 1:10 to about 1:1000.

Clause 8. A method comprising: functionalizing metal oxide particles that are bound to a pigment particle with a silica particle having a carboxylic acid (terminal, pendent, or include both terminal and pendent of such group) surface treatment to produce a surface treated pigment having a pendent carboxylic acid; converting the pendent carboxylic acid to a pendent acid chloride; and reacting the pendent acid chloride with a polyamide to yield a pigment-pendent polyamide (PP-polyamide).

Clause 9. The method of Clause 8, wherein the metal oxide particles comprise one or more selected from the group consisting of: titanium dioxide, a titanium suboxide, a titanium oxynitride, $Al_2O_3$, $Fe_2O_3$, $Fe_3O_4$, $SnO_2$, $Cr_2O_3$, ZnO, CuO, NiO, zirconium oxide, and an iron titanium oxide.

Clause 10. The method of Clause 8, wherein the pigment particle comprises one or more selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, and holographic pigments.

Clause 11. The method of Clause 8, wherein the silica particle having the carboxylic acid surface treatment comprises one or more selected from the group consisting of: 3-aminopropyl-(3-oxobutanoic) acid functionalized silica, 3-propylsulphonic acid-functionalized silica gel, propylcarboxylic acid functionalized silica, triaminetetraacetic acid-functionalized silica gel, propionyl chloride-functionalized silica gel, 3-carboxypropyl functionalized silica gel, aminomethylphosphonic acid (AMPA)-functionalized silica gel, and 1,4,7,10-tetraazacyclododecane-1,4,7,10-tetraacetic acid (DOTA)-functionalized silica gel.

Clause 12. The method of Clause 8, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 13. The method of Clause 8, wherein the reacting of the pendent acid chloride with the polyamide comprises melt mixing the pigment particle having a functionality with the pendent acid chloride with the polyamide for 15 minutes to about 1 hour at about 125° C. to about 250° C.

Clause 14. The method of Clause 8, wherein a weight ratio of the pigment to the polyamide is about 1:10 to about 1:1000.

Clause 15. A composition comprising: a polyamide having a pigment pendent from a backbone of the polyamide, wherein the pigment comprises metal oxide particles on the surface of a pigment particle.

Clause 16. The composition of Clause 15, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 17. The composition of Clause 15, wherein a weight ratio of the pigment to the polyamide is about 1:10 to about 1:1000.

Clause 18. The composition of Clause 15, wherein the pigment particle comprises one or more selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, and holographic pigments.

Clause 19. An article comprising: the composition of Clause 15.

Clause 20. A method comprising: depositing particles upon a surface in a specified shape, and once deposited, wherein the particles comprise the polyamide of one of claims 15-18; and heating at least a portion of the particles to promote consolidation thereof and form a consolidated body.

Clause 21. The method of Clause 20, wherein the particles further comprise a thermoplastic polymer selected from the group consisting of: polyurethane, polyethylene, polypropylene, polyacetal, polycarbonate, polybutylene terephthalate, polyethylene terephthalate, polyethylene naphthalate, polytrimethylene terephthalate, polyhexamethylene terephthalate, polystyrene, polyvinyl chloride, polytetrafluoroethene, polyester, polyether, polyether sulfone, polyetherether ketone, polyacrylate, polymethacrylate, polyimide, acrylonitrile butadiene styrene, polyphenylene sulfide, vinyl polymer, polyarylene ether, polyarylene sulfide, polysulfone, polyether ketone, polyamide-imide, polyetherimide, polyetherester, copolymers comprising a polyether block and a polyamide block, grafted or ungrafted thermoplastic polyolefin, functionalized or nonfunctionalized ethylene/vinyl monomer polymer, functionalized or nonfunctionalized ethylene/alkyl (meth)acrylate, functionalized or nonfunctionalized (meth)acrylic acid polymer, functionalized or nonfunctionalized ethylene/vinyl monomer/alkyl (meth)acrylate terpolymer, ethylene/vinyl monomer/carbonyl terpolymer, ethylene/alkyl (meth)acrylate/carbonyl terpolymer, methylmethacrylate-butadiene-styrene type coreshell polymer, polystyrene-block-polybutadiene-block-poly(methyl methacrylate) block terpolymer, chlorinated or chlorosulphonated polyethylene, polyvinylidene fluoride, phenolic resin, poly(ethylene/vinyl acetate), polybutadiene, polyisoprene, styrenic block copolymer, polyacrylonitrile, silicone, and any combination thereof.

Clause 22. A method comprising: mixing a mixture comprising a polyamide having a pigment pendent from a backbone of the polyamide (PP-polyamide), a carrier fluid that is immiscible with the PP-polyamide, and optionally an emulsion stabilizer at a temperature greater than a melting point or softening temperature of the PP-polyamide and at a shear rate sufficiently high to disperse the PP-polyamide in the carrier fluid; and cooling the mixture to below the melting point or softening temperature of the PP-polyamide to form solidified particles comprising the PP-polyamide and, when present, the emulsion stabilizer associated with an outer surface of the solidified particles.

Clause 23. The method of Clause 22, wherein the emulsion stabilizer is included in the mixture, and wherein the emulsion stabilizer associated with an outer surface of the solidified particles.

Clause 24. The method of Clause 23, wherein emulsion stabilizer comprises nanoparticles, and wherein the nanoparticles are embedded in the outer surface of the solidified particles.

Clause 25. The method of Clause 22, wherein the mixture further comprises a thermoplastic polymer that is not the PP-polyamide.

Clause 26. The method of Clause 22, wherein the mixture further comprises the polyamide of the PP-polyamide but without a pigment pendent therefrom.

Clause 27. The method of Clause 22, wherein the pigment is selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, holographic pigments, and any combination thereof.

Clause 28. The method of Clause 22, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 29. The method of Clause 22, wherein a weight ratio of the pigment to the polyamide is about 1:10 to about 1:1000.

Clause 30. The method of Clause 22, wherein at least some of the solidified particles have a void comprising the emulsion stabilizer at a void/polymer interface.

Clause 31. The method of Clause 30, wherein the emulsion stabilizer comprises nanoparticles and the nanoparticles are embedded in the void/polymer interface.

Clause 32. The method of Clause 30, wherein the void contains the carrier fluid.

Clause 33. The method of Clause 22, wherein the solidified particles further comprises elongated structures on the surface of the solidified particles, wherein the elongated structures comprises the PP-polyamide with the emulsion stabilizer associated with an outer surface of the elongated structures.

Clause 34. The method of Clause 22, wherein the emulsion stabilizer is included and forms a coating that covers less than 5% of the surface of the solidified particles.

Clause 35. The method of Clause 22, wherein the emulsion stabilizer is included and forms a coating that covers at least 5% of the surface of the solidified particles.

Clause 36. The method of Clause 22, wherein the emulsion stabilizer is included and forms a coating that covers at least 25% of the surface of the solidified particles.

Clause 37. The method of Clause 22, wherein the emulsion stabilizer is included and forms a coating that covers at least 50% of the surface of the solidified particles.

Clause 38. The method of Clause 22, wherein the PP-polyamide is present in the mixture at 5 wt % to 60 wt % of the mixture.

Clause 39. The method of Clause 22, wherein the emulsion stabilizer is included and is present in the mixture at 0.05 wt % to 5 wt % by weight of the PP-polyamide.

Clause 40. The method of Clause 22, wherein the emulsion stabilizer is included and comprises nanoparticles and the nanoparticles have an average diameter of 1 μm to 500 nm.

Clause 41. The method of Clause 22, wherein the carrier fluid is selected from the group consisting of: silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 42. The method of Clause 41, wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof.

Clause 43. The method of Clause 22, wherein the carrier fluid has a viscosity at 25° C. of 1000 cSt to 150,000 cSt.

Clause 44. The method of Clause 22, wherein the carrier fluid has a density of 0.6 $g/cm^3$ to 1.5 $g/cm^3$.

Clause 45. The method of Clause 22, wherein mixing occurs in an extruder.

Clause 46. The method of Clause 22, wherein mixing occurs in a stirred reactor.

Clause 47. The method of Clause 22, wherein the mixture further comprises a surfactant.

Clause 448. The method of Clause 22, wherein the solidified particles have a D10 of about 0.1 μm to about 125 μm, a D50 of about 0.5 μm to about 200 μm, and a D90 of about 3 μm to about 300 μm, wherein D10<D50<D90.

Clause 49. The method of Clause 22, wherein the solidified particles have a diameter span of about 0.2 to about 10.

Clause 50. The method of Clause 22, wherein the solidified particles have a D10 of about 5 μm to about 30 μm, a D50 of about 30 μm to about 70 μm, and a D90 of about 70 μm to about 120 μm, wherein D10<D50<D90.

Clause 51. The method of Clause 50, wherein the solidified particles have a diameter span of about 1.0 to about 2.5.

Clause 52. The method of Clause 22, wherein the solidified particles have a D10 of about 25 μm to about 60 μm, a D50 of about 60 μm to about 110 μm, and a D90 of about 110 μm to about 175 μm, wherein D10<D50<D90.

Clause 53. The method of Clause 52, wherein the solidified particles have a diameter span of about 0.6 to about 1.5.

Clause 54. The method of Clause 22, wherein the solidified particles have a D10 of about 75 μm to about 125 μm, a D50 of about 100 μm to about 200 μm, and a D90 of about 125 μm to about 300 μm, wherein D10<D50<D90.

Clause 55. The method of Clause 54, wherein the solidified particles have a diameter span of about 0.2 to about 1.2.

Clause 56. The method of Clause 22, wherein the solidified particles have a circularity of about 0.90 to about 1.0.

Clause 57. The method of Clause 22, wherein the solidified particles have a Hausner ratio of about 1.0 to about 1.5.

Clause 58. The method of Clause 22, wherein the emulsion stabilizer comprises nanoparticles and the nanoparticles comprise oxide nanoparticles.

Clause 59. The method of Clause 22, wherein the emulsion stabilizer comprises nanoparticles and the nanoparticles comprise carbon black.

Clause 60. The method of Clause 22, wherein the emulsion stabilizer comprises nanoparticles and the nanoparticles comprise polymer nanoparticles.

Clause 61. A composition comprising: particles comprising a polyamide having a pigment pendent from a backbone of the polyamide (PP-polyamide) and having a circularity of about 0.90 to about 1.0.

Clause 62. The composition of Clause 61, wherein the particles further comprise a thermoplastic polymer that is not the PP-polyamide.

Clause 63. The composition of Clause 61, wherein the particles further comprise the polyamide of the PP-polyamide but without a pigment pendent therefrom.

Clause 64. The composition of Clause 61, wherein the particles further comprise an emulsion stabilizer associated with an outer surface of the particles.

Clause 65. The composition of Clause 61, wherein at least some of the particles have a void comprising the emulsion stabilizer at a void/polymer interface.

Clause 66. The composition of Clause 65, wherein the emulsion stabilizer comprises nanoparticles and the nanoparticles are embedded in the void/polymer interface.

Clause 67. The composition of Clause 65, wherein the void contains the carrier fluid.

Clause 68. The composition of Clause 61, wherein the particles further comprises elongated structures on the surface of the particles, wherein the elongated structures comprises the PP-polyamide with the emulsion stabilizer associated with an outer surface of the elongated structures.

Clause 69. The composition of Clause 61, wherein the emulsion stabilizer forms a coating that covers less than 5% of the surface of the solidified particles.

Clause 70. The composition of Clause 61, wherein the emulsion stabilizer forms a coating that covers at least 5% of the surface of the solidified particles.

Clause 71. The composition of Clause 61, wherein the emulsion stabilizer forms a coating that covers at least 25% of the surface of the solidified particles.

Clause 72. The composition of Clause 61, wherein the emulsion stabilizer forms a coating that covers at least 50% of the surface of the solidified particles.

Clause 73. The composition of Clause 61, wherein the emulsion stabilizer comprises nanoparticles having an average diameter of 1 μm to 500 μm.

Clause 74. The composition of Clause 61, wherein the solidified particles have a D10 of about 0.5 μm to about 125 μm, a D50 of about 1 μm to about 200 μm, and a D90 of about 70 μm to about 300 μm, wherein D10<D50<D90.

Clause 75. The composition of Clause 61, wherein the solidified particles have a diameter span of about 0.2 to about 10.

Clause 76. The composition of Clause 61, wherein the solidified particles have a D10 of about 5 μm to about 30 μm, a D50 of about 30 μm to about 70 μm, and a D90 of about 70 μm to about 120 μm, wherein D10<D50<D90.

Clause 77. The composition of Clause 76, wherein the solidified particles have a diameter span of about 1.0 to about 2.5.

Clause 78. The composition of Clause 61, wherein the solidified particles have a D10 of about 25 μm to about 60 μm, a D50 of about 60 μm to about 110 μm, and a D90 of about 110 μm to about 175 μm, wherein D10<D50<D90.

Clause 79. The composition of Clause 78, wherein the solidified particles have a diameter span of about 0.6 to about 1.5.

Clause 80. The composition of Clause 61, wherein the solidified particles have a D10 of about 75 μm to about 125 μm, a D50 of about 100 μm to about 200 μm, and a D90 of about 125 μm to about 300 μm, wherein D10<D50<D90.

Clause 81. The composition of Clause 80, wherein the solidified particles have a diameter span of about 0.2 to about 1.2.

Clause 82. The composition of Clause 61, wherein the solidified particles have a Hausner ratio of about 1.0 to about 1.5.

Clause 83. A method comprising: depositing the composition of Clause 61 optionally in combination with other thermoplastic polymer particles upon a surface in a specified shape; and once deposited, heating at least a portion of the particles to promote consolidation thereof and form a consolidated body.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Prophetic Example 1: IRIODIN® 100 Silver Pearl Pigment Reacted with (3-Glycidyloxypropyl)Trimethoxysilane and Crosslinked by Polyamide Resin in Solution Into a 2 liter glass reactor equipped with an overhead mechanical stirrer and a heating mantle is added 100 g of IRIODIN® 100 Silver Pearl pigment (available from E.

Merck KGaA, Darmstadt) suspended in 900 mL of deionized water and heated to 40° C. with vigorous stirring. The suspension is adjusted to pH of 3.3 using 2.5% hydrochloric acid and the temperature is raised to 75° C.

Subsequently, 3.0 g of (3-glycidyloxypropyl)trimethoxysilane (available from Millipore Sigma) is added over the course of 10 minutes and the pH is kept constant using the 2.5% hydrochloric acid solution. At the end of the addition, stirring is continued at 75° C. for 2 hours during which the silane hydrolyzes and the resulting silanols associate with the inorganic pigment surface.

Subsequently, the system is adjusted to a pH of 8.0 while maintaining the reaction temperature of 75° C. using 2.5% sodium hydroxide solution very slowly over the course of 1 hour during which time the condensation reaction occurs and the resulting siloxane bonds to the pigment surface leaving the unreacted epoxy end group free for subsequent functionalization. Stirring is continued at 75° C. for an additional 1 hour to complete the reaction and the pH falls to 7.0. The product is filtered off using vacuum filtration, washed with deionized water and dried at 140° C. for approximately 16 hours.

Subsequently, 100 g of polyamide resin, such as nylon 6,6, is dissolved in N-methyl-2-pyrrolidone (NMP) with vigorous agitation. To this mixture is added 10 g of the epoxide functionalized IRIODIN® 100 Silver Pearl pigment from above and the reaction mixture with continuous agitation is increased to 150° C. for 2 hours to facilitate the curing reaction of the amino functional groups of the polyamide resin with the pendent glycidyloxypropyl (epoxide) group coating the surface of IRIODIN® 100 Silver Pearl pigment. After the polyamide resin has cured and coated the suspended IRIODIN® 100 Silver Pearl pigment the solvent is removed by filtering the particles using vacuum filtration and the material is thoroughly dried in a vacuum oven for 24 hours. Then a portion of this mixture is mixed with non-pigment-pendant polyamide in the Haake reaction with PDMS to form the particles.

Using 2.5 g of IRIODIN® 100 Silver Pearl pigment-pendent crosslinked by polyamide resin onto the pigment surface and 27.5 g of nylon 6,6 is melt mixed with 150 g of polydimethylsiloxane (PDMS) of 60,000 specific viscosity by hot melt emulsification in a Haake mixer fitted with a 300 ml mixing vessel. The mixer is heated to 230° C. and mixed at 200 rpm for 20 minutes. Then, the mixture is discharged from the Haake onto a cold surface to provide rapid quench cooling. The resultant mixture is then filtered through a 90 mm WHATMAN® #1 paper filter (available from SigmaAldrich) to separate the PP-polyamide particles from the carrier fluid. The PP-polyamide particles are washed three times with 1000 mL of ethyl acetate. The PP-polyamide particles are then allowed to air dry overnight in an aluminum pan in a fume hood. Optionally, the dried PP-polyamide particles can be screened through a 150-μm sieve. The PP-polyamide particles are then characterized for size with a Malvern MASTERSIZER™ 3000 and morphology with SEM micrographs. The D50 (μm) is predicted to be around 50 μm with a span of about 0.85.

Prophetic Example 2: BLONDIEE® Metallic Super Gold Pigment Reacted with (3-Glycidyloxypropyl)Trimethoxysilane and In-Situ Crosslinking with Polyamide Resin Into a 2 liter glass reactor equipped with an overhead mechanical stirrer and a heating mantle is added 100 g of BLONDIEE® Metallic Super Gold pigment, product code N-2002S (available from Creation of Quality Value Company Ltd.) suspended in 900 mL of deionized water and heated to 40° C. with vigorous stirring. The suspension is adjusted to pH of 3.3 using 2.5% hydrochloric acid and the temperature is raised to 75° C.

Subsequently, 3.0 g of (3-glycidyloxypropyl)trimethoxysilane (available from Millipore Sigma) is added over the course of 10 minutes and the pH is kept constant using the 2.5% hydrochloric acid solution. At the end of the addition, stirring is continued at 75° C. for 2 hours during which the silane hydrolyzes and the resulting silanols associate with the inorganic pigment surface.

Subsequently, the system is adjusted to a pH of 8.0 while maintaining the reaction temperature of 75° C. using 2.5% sodium hydroxide solution very slowly over the course of 1 hour during which time the condensation reaction occurs and the resulting siloxane bonds to the pigment surface leaving the unreacted epoxy end group free for subsequent functionalization. Stirring is continued at 75° C. for an additional 1 hour to complete the reaction and the pH falls to 7.0. The product is filtered off using vacuum filtration, washed with deionized water and dried at 140° C. for approximately 16 hours.

Subsequently, 50 g of polyamide resin such as nylon 6,6 is melt mixed with 10 g of the above epoxide surface functionalized mica pigment Blondiee® Metallic Super Gold melt mixed in the Haake mixer at 150° C. to 200° C. for 20 to 30 minutes to facilitate the crosslinking reaction of the epoxide with the amino group of the polyamide resin. The resulting pigment-pendent polyamide resin concentrate is discharged from the Haake mixer, cooled and grounded into a fine powder for subsequent incorporation into pigmented polyamide micron particles.

Using 1.5 g of BLONDIEE® Metallic Super Gold pigment-pendent crosslinked polyamide resin onto the pigment surface and 28.5 g of nylon 6,6 is melt mixed with 150 g of polydimethylsiloxane (PDMS) of 30,000 specific viscosity by hot melt emulsification in a Haake mixer fitted with a 300 ml mixing vessel. The mixer is heated to 230° C. and mixed at 200 rpm for 20 minutes.

Then, the mixture is discharged from the Haake onto a cold surface to provide rapid quench cooling. The resultant mixture is then filtered through a 90 mm WHATMAN® #1 paper filter (available from SigmaAldrich) to separate the PP-polyamides particles from the carrier fluid. The particles are washed three times with 1000 mL of ethyl acetate. The particles are then allowed to air dry overnight in an aluminum pan in a fume hood. Optionally, the dried particles can be screened through a 150-μm sieve. The PP-polyamide particles are then characterized for size with a Malvern MASTERSIZER™ 3000 and morphology with SEM micrographs. The D50 (μm) is predicted to be around 65 μm with a span of about 1.20.

Prophetic Example 3: REFLEX® 100 Sparkle Violet Pigment Reacted with (3-Glycidyloxypropyl)Trimethoxysilane and Crosslinked by Polyamide Resin in Solution Into a 2 liter glass reactor equipped with an overhead mechanical stirrer and a heating mantle is added 100 g of REFLEX® 100 Sparkle Violet R-706E pigment (available from Creation of Quality Value Company Ltd.) suspended in 900 mL of deionized water and heated to 40° C. with vigorous stirring. The suspension is adjusted to pH of 3.3 using 2.5% hydrochloric acid and the temperature is raised to 75° C.

Subsequently, 3.0 g of (3-glycidyloxypropyl)trimethoxysilane (available from Millipore Sigma) is added over the course of 10 minutes and the pH is kept constant using the 2.5% hydrochloric acid solution. At the end of the addition, stirring is continued at 75° C. for 2 hours during which the silane hydrolyzes and the resulting silanols associate with the inorganic pigment surface.

Subsequently, the system is adjusted to a pH of 8.0 while maintaining the reaction temperature of 75° C. using 2.5% sodium hydroxide solution very slowly over the course of 1 hour during which time the condensation reaction occurs and the resulting siloxane bonds to the pigment surface leaving the unreacted epoxy end group free for subsequent functionalization. Stirring is continued at 75° C. for an additional 1 hour to complete the reaction and the pH falls to 7.0. The product is filtered off using vacuum filtration, washed with deionized water and dried at 140° C. for approximately 16 hours.

Subsequently, 100 g of polyamide resin such as nylon 6,6 is dissolved in N-methyl-2-pyrrolidone (NMP) with vigorous agitation. To this mixture is added 10 g of the epoxide functionalized REFLEX® 100 Sparkle Violet R-706E pigment from above and the reaction mixture with continuous agitation is increased to 150° C. for 2 hours to facilitate the curing reaction of the amino functional groups of the polyamide resin with the pendent glycidyloxypropyl (epoxide) group coating the surface of REFLEX® 100 Sparkle Violet R-706E pigment. After the polyamide resin has cured and coated the suspended REFLEX® 100 Sparkle Violet R-706E pigment the solvent is removed by filtering the particles using vacuum filtration and the material is thoroughly dried in a vacuum oven for 24 hours. Then a portion of this mixture is mixed with non-pigment-pendant polyamide in the Haake reaction with PDMS to form the particles.

Using 50 g of REFLEX® 100 Sparkle Violet R-706E pigment-pendent crosslinked by polyamide resin onto the pigment surface and 550 g of nylon 6,6 is melt mixed with 2000 g of polydimethylsiloxane (PDMS) of 10,000 specific viscosity by hot melt emulsification in a 25 mm twin-screw extruder (Werner & Pfleiderer ZSK-25). The polymer pellets are added to the extruder first, brought to the temperature of 230° C. and rpm of 900, and then preheated carrier fluid having AEROSIL® R812S silica nanoparticles (1.1-wt. % relative to PP-polyamide) dispersed therein is added to the molten polymer in the extruder.

Then the mixture is discharged into a container and allowed to cool to room temperature over several hours. The resultant mixture is then filtered through a 90 mm WHATMAN® #1 paper filter (available from SigmaAldrich) to separate the PP-polyamides particles from the carrier fluid. The particles are washed three times with 2000 mL of ethyl acetate. The particles are then allowed to dry overnight in vacuum oven at ambient temperature. Optionally, the dried particles can be screened through a 150-μm sieve. The PP-polyamide particles are then characterized for size with a Malvern MASTERSIZER™ 3000 and morphology with SEM micrographs. The D50 (μm) is predicted to be around 75 μm with a span of about 1.30.

Prophetic Example 4: Reflex® Glitter Blue R-781E
Pigment Reacted with
(3-Glycidyloxypropyl)Trimethoxysilane and In-Situ
Crosslinking with Polyamide Resin Into a 2 liter glass reactor equipped with an overhead mechanical stirrer and a heating mantle is added 100 g of Reflex® Glitter Blue pigment, product code R-781E (available from Creation of Quality Value Company Ltd.) suspended in 900 mL of deionized water and heated to 40° C. with vigorous stirring. The suspension is adjusted to pH of 3.3 using 2.5% hydrochloric acid and the temperature is raised to 75° C.

Subsequently, 3.0 g of (3-glycidyloxypropyl)trimethoxysilane (available from Millipore Sigma) is added over the course of 10 minutes and the pH is kept constant using the 2.5% hydrochloric acid solution. At the end of the addition, stirring is continued at 75° C. for 2 hours during which the silane hydrolyzes and the resulting silanols associate with the inorganic pigment surface.

Subsequently, the system is adjusted to a pH of 8.0 while maintaining the reaction temperature of 75° C. using 2.5% sodium hydroxide solution very slowly over the course of 1 hour during which time the condensation reaction occurs and the resulting siloxane bonds to the pigment surface leaving the unreacted epoxy end group free for subsequent functionalization. Stirring is continued at 75° C. for an additional 1 hour to complete the reaction and the pH falls to 7.0. The product is filtered off using vacuum filtration, washed with deionized water and dried at 140° C. for approximately 16 hours.

Subsequently, 50 g of polyamide resin such as nylon 6,6 is melt mixed with 10 g of the above epoxide surface functionalized mica pigment Reflex® Glitter Blue R-871E melt mixed in the Haake mixer at 150° C. to 200° C. for 20 to 30 minutes to facilitate the crosslinking reaction of the epoxide with the amino group of the polyamide resin. The resulting pigment-pendent polyamide resin concentrate is discharged from the Haake mixer, cooled and grounded into a fine powder for subsequent incorporation into pigmented polyamide micron particles.

Using 30 g of REFLEX® Glitter Blue R-871E pigment-pendent crosslinked polyamide resin onto the pigment surface and 570 g of nylon 6,6 is melt mixed with 2000 g of polydimethylsiloxane (PDMS) of 10,000 specific viscosity by hot melt emulsification in a 25 mm twin-screw extruder (Werner & Pfleiderer ZSK-25). The polymer pellets are added to the extruder first, brought to the temperature of 230° C. and rpm of 900, and then preheated carrier fluid having AEROSIL® R812S silica nanoparticles (1.1 wt % relative to PP-polyamide) dispersed therein is added to the molten polymer in the extruder.

Then the mixture is discharged into a container and allowed to cool to room temperature over several hours. The resultant mixture is then filtered through a 90 mm WHATMAN® #1 paper filter (available from SigmaAldrich) to separate the PP-polyamides particles from the carrier fluid. The particles are washed three times with 2000 mL of ethyl acetate. The particles are then allowed to dry overnight in vacuum oven at ambient temperature. Optionally, the dried particles can be screened through a 150-μm sieve. The PP-polyamide particles are then characterized for size with a Malvern MASTERSIZER™ 3000 and morphology with SEM micrographs. The D50 (μm) is predicted to be around 65 μm with a span of about 1.10.

Prophetic Example 5: IRIODIN® 100 Silver Pearl
Pigment Reacted with
3-Aminopropyl(3-Oxobutaonoic)Acid
Functionalized Silica Nanoparticles and In-Situ
Crosslinked by Polyamide Resin Into a 2 liter glass reactor equipped with an overhead mechanical stirrer and a heating mantle is added 100 g of IRIODIN® 100 Silver Pearl pigment (available from E. Merck KGaA, Darmstadt, Germany) suspended in 900 mL of deionized water and 100 mL of 3-aminopropyl(3-oxobutaonoic)acid functionalized silica nanoparticles as a colloidal dispersion at 2.5 wt % loading in dimethylformamide (DMF) (available from Millipore Sigma). The mixture was heated to 40° C. with vigorous stirring for 4 hours to facilitate the adsorption of the silica nanoparticles onto the surface of the pigment. The suspension is cooled to room temperature and filtered to remove the water and DMF solvent. The functionalized pigment particles with free carboxylic acid functional groups are dried in a vacuum oven at 40° C. for 24 hours to produce a functionalized pigment powder.

A clear viscous stock solution (1.5 molar) of thionyl chloride (5.46 mL, 0.075 mol) and benzotriazole (8.93 g, 0.075 mol) in 50 mL of dry methylene chloride was prepared at room temperature with mixing. A portion of this solution (1.25 mmol) is added slowly to convert the pendent carboxylic acid functional groups on the surface of the mica pigment to acid chloride to enable curing with the amino polyamide group in the polyamide resin.

The dried mica pigment IRIODIN® 100 Silver Pearl functionalized with surface carboxylic acid (approximately 110 g) is suspended in 500 mL of dry methylene chloride with constant agitation. To this mixture is added 20 mL of the thionyl chloride-benzotriazole mixture slowly over 30 minutes at room temperature. As the reaction proceeds benzotriazole hydrochloride salt starts to precipitate out of the solution indicating the conversion of the carboxylic acid is converted to the acid chloride. The reaction mixture is mixed for an additional 30 minutes and then the mixture is filtered to remove the solvent and thoroughly washed with water then dried in a vacuum oven for 24 hours.

Subsequently, 50 g of polyamide resin such as nylon 6,6 is melt mixed with 10 g of the above acid chloride surface functionalized mica pigment IRIODIN® 100 Silver Pearl melt mixed in the Haake mixer at 150° C. to 200° C. for 20 to 30 minutes to facilitate the crosslinking reaction of the acid chloride with the amino group of the polyamide resin. The resulting pigment-pendent polyamide resin concentrate is discharged from the Haake mixer, cooled and grounded into a fine powder for subsequent incorporation into pigmented polyamide micron particles.

Using 1.5 g of IRIODIN® 100 Silver Pearl pigment-pendent crosslinked polyamide resin onto the pigment surface and 28.5 g of nylon 6,6 is melt mixed with 150 g of polydimethylsiloxane (PDMS) of 30,000 specific viscosity containing AEROSIL® R812S silica nanoparticles (0.75 wt % relative to PP-polyamide) dispersed therein by hot melt emulsification in a Haake mixer fitted with a 300 ml mixing vessel. The mixer is heated to 230° C. and mixed at 200 rpm for 15 minutes.

Then, the mixture is discharged from the Haake onto a cold surface to provide rapid quench cooling. The resultant mixture is then filtered through a 90 mm WHATMAN® #1 paper filter (available from SigmaAldrich) to separate the PP-polyamides particles from the carrier fluid. The particles are washed three times with 1000 mL of ethyl acetate. The particles are then allowed to air dry overnight in an aluminum pan in a fume hood. Optionally, the dried particles can be screened through a 150-µm sieve. The PP-polyamide particles are then characterized for size with a Malvern MASTERSIZER™ 3000 and morphology with SEM micrographs. The D50 (µm) is predicted to be around 55 µm with a span of about 1.10.

Prophetic Example 6: BLONDIEE® Metallic Super Gold Pigment Reacted with 3-Aminopropyl(3-Oxobutaonoic)Acid Functionalized Silica Nanoparticles and in-Situ Crosslinked by Polyamide Resin Into a 2 liter glass reactor equipped with an overhead mechanical stirrer and a heating mantle is added 100 g of BLONDIEE® Metallic Super Gold (available from Creation of Quality Value Company Ltd.) suspended in 900 mL of deionized water and 100 mL of 3-aminopropyl(3-oxobutaonoic)acid functionalized silica nanoparticles as a colloidal dispersion at 2.5 wt % loading in DMF (available from Millipore Sigma). The mixture was heated to 40° C. with vigorous stirring for 4 hours to facilitate the adsorption of the silica nanoparticles onto the surface of the pigment. The suspension is cooled to room temperature and filtered to remove the water and DMF solvent. The functionalized pigment particles with free carboxylic acid functional groups are dried in a vacuum oven at 40° C. for 24 hours to produce a functionalized pigment powder.

A clear viscous stock solution (1.5 molar) of thionyl chloride (5.46 mL, 0.075 mol) and benzotriazole (8.93 g, 0.075 mol) in 50 mL of dry methylene chloride was prepared at room temperature with mixing. A portion of this solution (1.25 mmol) is added slowly to convert the pendent carboxylic acid functional groups on the surface of the mica pigment to acid chloride to enable curing with the amino polyamide group in the polyamide resin.

The dried mica pigment BLONDIEE® Metallic Super Gold functionalized with surface carboxylic acid (approximately 110 g) is suspended in 500 mL of dry methylene chloride with constant agitation. To this mixture is added 20 mL of the thionyl chloride-benzotriazole mixture slowly over 30 minutes at room temperature. As the reaction proceeds benzotriazole hydrochloride salt starts to precipitate out of the solution indicating the conversion of the carboxylic acid is converted to the acid chloride. The reaction mixture is mixed for an additional 30 minutes and then the mixture is filtered to remove the solvent and thoroughly washed with water then dried in a vacuum oven for 24 hours.

Subsequently, 50 g of polyamide resin such as nylon 6,6 is melt mixed with 10 g of the above acid chloride surface functionalized mica pigment Blondiee® Metallic Super Gold melt mixed in the Haake mixer at 150° C. to 200° C. for 20 to 30 minutes to facilitate the crosslinking reaction of the acid chloride with the amino group of the polyamide resin. The resulting pigment-pendent polyamide resin concentrate is discharged from the Haake mixer, cooled and grounded into a fine powder for subsequent incorporation into pigmented polyamide micron particles.

Using 1.5 g of BLONDIEE® Metallic Super Gold pigment-pendent crosslinked polyamide resin onto the pigment surface and 28.5 g of nylon 6,6 is melt mixed with 150 g of polydimethylsiloxane (PDMS) of 30,000 specific viscosity containing AEROSIL® R812S silica nanoparticles (1.00 wt % relative to PP-polyamide) dispersed therein by hot melt emulsification in a Haake mixer fitted with a 300 ml mixing vessel. The mixer is heated to 230° C. and mixed at 200 rpm for 15 minutes.

Then, the mixture is discharged from the Haake onto a cold surface to provide rapid quench cooling. The resultant mixture is then filtered through a 90 mm WHATMAN® #1 paper filter (available from SigmaAldrich) to separate the PP-polyamides particles from the carrier fluid. The particles are washed three times with 1000 mL of ethyl acetate. The particles are then allowed to air dry overnight in an aluminum pan in a fume hood. Optionally, the dried particles can be screened through a 150-μm sieve. The PP-polyamide particles are then characterized for size with a Malvern MASTERSIZER™ 3000 and morphology with SEM micrographs. The D50 (μm) is predicted to be around 50 μm with a span of about 0.95.

Prophetic Example 7: REFLEX® 100 Sparkle Violet Pigment Reacted with 3-Aminopropyl(3-Oxobutaonoic)Acid Functionalized Silica Nanoparticles and In-Situ Crosslinked by Polyamide Resin Into a 2 liter glass reactor equipped with an overhead mechanical stirrer and a heating mantle is added 100 g of REFLEX® 100 Sparkle Violet R-706E (available from Creation of Quality Value Company Ltd.) suspended in 900 mL of deionized water and 100 mL of 3-aminopropyl(3-oxobutaonoic)acid functionalized silica nanoparticles as a colloidal dispersion at 2.5 wt % loading in DMF (available from Millipore Sigma). The mixture was heated to 40° C. with vigorous stirring for 4 hours to facilitate the adsorption of the silica nanoparticles onto the surface of the pigment. The suspension is cooled to room temperature and filtered to remove the water and DMF solvent. The functionalized pigment particles with free carboxylic acid functional groups are dried in a vacuum oven at 40° C. for 24 hours to produce a functionalized pigment powder.

A clear viscous stock solution (1.5 molar) of thionyl chloride (5.46 mL, 0.075 mol) and benzotriazole (8.93 g, 0.075 mol) in 50 mL of dry methylene chloride was prepared at room temperature with mixing. A portion of this solution (1.25 mmol) is added slowly to convert the pendent carboxylic acid functional groups on the surface of the mica pigment to acid chloride to enable curing with the amino polyamide group in the polyamide resin.

The dried mica pigment REFLEX® 100 Sparkle Violet R-706E functionalized with surface carboxylic acid (approximately 110 g) is suspended in 500 mL of dry methylene chloride with constant agitation. To this mixture is added 20 mL of the thionyl chloride-benzotriazole mixture slowly over 30 minutes at room temperature. As the reaction proceeds benzotriazole hydrochloride salt starts to precipitate out of the solution indicating the conversion of the carboxylic acid is converted to the acid chloride. The reaction mixture is mixed for an additional 30 minutes and then the mixture is filtered to remove the solvent and thoroughly washed with water then dried in a vacuum oven for 24 hours.

Subsequently, 50 g of polyamide resin such as nylon 6,6 is melt mixed with 10 g of the above acid chloride surface functionalized mica pigment Reflex® 100 Sparkle Violet R-706E melt mixed in the Haake mixer at 150° C. to 200° C. for 20 to 30 minutes to facilitate the crosslinking reaction of the acid chloride with the amino group of the polyamide resin. The resulting pigment-pendent polyamide resin concentrate is discharged from the Haake mixer, cooled and grounded into a fine powder for subsequent incorporation into pigmented polyamide micron particles.

Using 30 g of REFLEX® 100 Sparkle Violet R-706E pigment-pendent crosslinked polyamide resin onto the pigment surface and 570 g of nylon 6,6 is melt mixed with 2000 g of polydimethylsiloxane (PDMS) of 20,000 specific viscosity by hot melt emulsification in a 25 mm twin-screw extruder (Werner & Pfleiderer ZSK-25). The polymer pellets are added to the extruder first, brought to the temperature of 230° C. and rpm of 1100, and then preheated carrier fluid having AEROSIL® R812S silica nanoparticles (1.1 wt % relative to PP-polyamide) dispersed therein is added to the molten polymer in the extruder Then the mixture is discharged into a container and allowed to cool to room temperature over several hours. The resultant mixture is then filtered through a 90 mm WHATMAN® #1 paper filter (available from SigmaAldrich) to separate the PP-polyamides particles from the carrier fluid. The particles are washed three times with 2000 mL of ethyl acetate. The particles are then allowed to dry overnight in vacuum oven at ambient temperature. Optionally, the dried particles can be screened through a 150-μm sieve. The PP-polyamide particles are then characterized for size with a Malvern MASTERSIZER™ 3000 and morphology with SEM micrographs. The D50 (μm) is predicted to be around 55 μm with a span of about 1.30.

Prophetic Example 8: REFLEX® Glitter Blue R-781E Pigment Reacted with 3-Aminopropyl(3-Oxobutaonoic)Acid Functionalized Silica Nanoparticles and In-Situ Crosslinked by Polyamide Resin Into a 2 liter glass reactor equipped with an overhead mechanical stirrer and a heating mantle is added 100 g of REFLEX® Glitter Blue pigment, product code R-781E (available from Creation of Quality Value Company Ltd.) suspended in 900 mL of deionized water and 100 mL of 3-aminopropyl(3-oxobutaonoic)acid functionalized silica nanoparticles as a colloidal dispersion at 2.5 wt % loading in DMF (available from Millipore Sigma). The mixture was heated to 40° C. with vigorous stirring for 4 hours to facilitate the adsorption of the silica nanoparticles onto the surface of the pigment. The suspension is cooled to room temperature and filtered to remove the water and DMF solvent. The functionalized pigment particles with free carboxylic acid functional groups are dried in a vacuum oven at 40° C. for 24 hours to produce a functionalized pigment powder.

A clear viscous stock solution (1.5 molar) of thionyl chloride (5.46 mL, 0.075 mol) and benzotriazole (8.93 g, 0.075 mol) in 50 mL of dry methylene chloride was prepared at room temperature with mixing. A portion of this solution (1.25 mmol) is added slowly to convert the pendent carboxylic acid functional groups on the surface of the mica pigment to acid chloride to enable curing with the amino polyamide group in the polyamide resin.

The dried mica pigment REFLEX® Glitter Blue functionalized with surface carboxylic acid (approximately 110 g) is suspended in 500 mL of dry methylene chloride with constant agitation. To this mixture is added 20 mL of the thionyl chloride-benzotriazole mixture slowly over 30 minutes at room temperature. As the reaction proceeds benzotriazole hydrochloride salt starts to precipitate out of the solution indicating the conversion of the carboxylic acid is converted to the acid chloride. The reaction mixture is mixed for an additional 30 minutes and then the mixture is filtered to remove the solvent and thoroughly washed with water then dried in a vacuum oven for 24 hours.

Subsequently, 50 g of polyamide resin such as nylon 6,6 is melt mixed with 10 g of the above acid chloride surface functionalized mica pigment Reflex® Glitter Blue melt mixed in the Haake mixer at 150° C. to 200° C. for 20 to 30 minutes to facilitate the crosslinking reaction of the acid chloride with the amino group of the polyamide resin. The resulting pigment-pendent polyamide resin concentrate is discharged from the Haake mixer, cooled and grounded into a fine powder for subsequent incorporation into pigmented polyamide micron particles.

Using 1.5 g of Reflex® Glitter Blue pigment-pendent crosslinked polyamide resin onto the pigment surface and 28.5 g of Nylon 6,6 is melt mixed with 150 g of polydimethylsiloxane (PDMS) of 60,000 specific viscosity containing AEROSIL® R812S silica nanoparticles (0.75 wt % relative to PP-polyamide) dispersed therein by hot melt emulsification in a Haake mixer fitted with a 300 ml mixing vessel. The mixer is heated to 230° C. and mixed at 200 rpm for 20 minutes.

Then, the mixture is discharged from the Haake onto a cold surface to provide rapid quench cooling. The resultant mixture is then filtered through a 90 mm WHATMAN® #1 paper filter (available from SigmaAldrich) to separate the PP-polyamides particles from the carrier fluid. The particles are washed three times with 1000 mL of ethyl acetate. The particles are then allowed to air dry overnight in an aluminum pan in a fume hood. Optionally, the dried particles can be screened through a 150-μm sieve. The PP-polyamide particles are then characterized for size with a Malvern MASTERSIZER™ 3000 and morphology with SEM micrographs. The D50 (μm) is predicted to be around 75 μm with a span of about 0.85.

Prophetic Example 9: General Epoxide and Polyamide Reaction Conditions

The epoxide group on the metallic pigment reactions with the polyamide may be performed under an atmosphere (nitrogen or argon) at temperatures of about 70° C. to about 200° C. (or about 70° C. to about 150° C., about 125° C. to about 200° C.) in the presence of an organic solvent such as tetrahydrofuan, dimethylformamide, toluene, and the like, and any combination thereof. The mixture is then stirred for about 24 hours at an elevated temperature. After cooling the mixture to room temperature, the grafted polymer is filtered and washed to remove organic impurities and unreacted starting reagents.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately α-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   mixing a mixture comprising a polyamide having a pigment covalently pendent from a backbone of the polyamide (PP-polyamide), a carrier fluid that is immiscible with the PP-polyamide, and optionally an emulsion stabilizer at a temperature greater than a melting point or softening temperature of the PP-polyamide and at a shear rate sufficiently high to disperse the PP-polyamide in the carrier fluid, wherein the emulsion stabilizer is different than the pigment; and
   cooling the mixture to below the melting point or softening temperature of the PP-polyamide to form solidified particles comprising the PP-polyamide and, when present, the emulsion stabilizer associated with an outer surface of the solidified particles.

2. The method of claim 1, wherein the emulsion stabilizer is included in the mixture, and wherein the emulsion stabilizer associated with an outer surface of the solidified particles.

3. The method of claim 2, wherein emulsion stabilizer comprises nanoparticles, and wherein the nanoparticles are embedded in the outer surface of the solidified particles.

4. The method of claim 1, wherein the mixture further comprises a thermoplastic polymer that is not the PP-polyamide.

5. The method of claim 1, wherein the mixture further comprises the polyamide of the PP-polyamide but without a pigment covalently pendent therefrom.

6. The method of claim 1, wherein the pigment is selected from the group consisting of: synthetic mica, natural mica, talc, sericite, kaolin, glass, $SiO_2$ flakes, $Al_2O_3$ flakes, glass flakes, acicular pigments, $CaSO_4$, iron oxides, chromium oxides, carbon black, metal effect pigments, optically variable pigments, liquid crystal polymer pigments, holographic pigments, and any combination thereof.

7. The method of claim 1, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

8. The method of claim 1, wherein a weight ratio of the pigment to the polyamide is about 1:10 to about 1:1000.

9. The method of claim 1, wherein the PP-polyamide comprises the backbone of the polyamide being covalently bonded to a metal oxide particle that is on a surface of the pigment.

10. The method of claim 1, wherein the PP-polyamide comprises the backbone of the polyamide being covalently bonded to a silica particle that is grafted to a metal oxide particle that is on a surface of the pigment.

* * * * *